US012631950B2

(12) United States Patent
Nakamura et al.

(10) Patent No.: US 12,631,950 B2
(45) Date of Patent: May 19, 2026

(54) LIGHT SOURCE DEVICE AND PROJECTION APPARATUS

(71) Applicants: Kasumi Nakamura, Kanagawa (JP); Yohei Takano, Kanagawa (JP); Kazuhiro Fujita, Tokyo (JP)

(72) Inventors: Kasumi Nakamura, Kanagawa (JP); Yohei Takano, Kanagawa (JP); Kazuhiro Fujita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 534 days.

(21) Appl. No.: 18/104,802

(22) Filed: Feb. 2, 2023

(65) Prior Publication Data

US 2023/0251558 A1 Aug. 10, 2023

(30) Foreign Application Priority Data

Feb. 9, 2022 (JP) ................................. 2022-018841
Nov. 11, 2022 (JP) ................................. 2022-181040

(51) Int. Cl.
*G03B 21/20* (2006.01)

(52) U.S. Cl.
CPC ....... *G03B 21/204* (2013.01); *G03B 21/2066* (2013.01); *G03B 21/208* (2013.01)

(58) Field of Classification Search
CPC . G03B 21/204; G03B 21/2066; G03B 21/208
USPC ......................................................... 353/98
See application file for complete search history.

(56) References Cited

U.S. PATENT DOCUMENTS

| | | | |
|---|---|---|---|
| 2012/0140186 A1* | 6/2012 | Kuwata ................... | H04N 9/317 |
| | | | 353/31 |
| 2015/0205189 A1* | 7/2015 | Nojima ................ | H10H 20/851 |
| | | | 353/31 |
| 2018/0074302 A1 | 3/2018 | Takano et al. | |
| 2018/0088452 A1* | 3/2018 | Tajiri ..................... | G03B 33/12 |
| 2019/0170988 A1 | 6/2019 | Takano et al. | |
| 2019/0219801 A1 | 7/2019 | Takano et al. | |

(Continued)

FOREIGN PATENT DOCUMENTS

| | | |
|---|---|---|
| JP | 2018-159837 | 10/2018 |
| JP | 2020-160434 | 10/2020 |

(Continued)

OTHER PUBLICATIONS

Translation of WO_2015145612_A1 (Year: 2025).*

*Primary Examiner* — Jerry L Brooks
(74) *Attorney, Agent, or Firm* — XSENSUS LLP

(57) ABSTRACT

A light source device includes: a first light source configured to emit a first excitation beam; a second light source different from the first light source, a second light source configured to emit a second excitation beam; an optical combiner configured to: reflect or transmit the first excitation beam; and reflect or transmit the second excitation beam; a first wavelength converter including a first phosphor to emit a first fluorescent beam proceeding in a first optical path; and a second wavelength convertor including a second phosphor to emit a second fluorescent beam proceeding in a second optical path. The optical combiner is at a point at which the first optical path of the first fluorescent beam intersects the second optical path of the second fluorescent beam.

17 Claims, 36 Drawing Sheets

(56)                    References Cited

U.S. PATENT DOCUMENTS

| | | | |
|---|---|---|---|
| 2019/0285979 A1 | 9/2019 | Takano et al. | |
| 2020/0064719 A1 | 2/2020 | Nakamura et al. | |
| 2020/0201008 A1 | 6/2020 | Takano et al. | |
| 2020/0230886 A1 | 7/2020 | Takano et al. | |
| 2020/0301260 A1 | 9/2020 | Takano et al. | |
| 2020/0301266 A1 | 9/2020 | Nakamura et al. | |
| 2021/0136336 A1 | 5/2021 | Takano et al. | |
| 2021/0173290 A1 | 6/2021 | Takano et al. | |
| 2021/0200075 A1 | 7/2021 | Nakamura et al. | |
| 2021/0223538 A1* | 7/2021 | Zhang | G03B 21/2066 |
| 2021/0389652 A1 | 12/2021 | Takano et al. | |
| 2022/0066177 A1 | 3/2022 | Takano et al. | |
| 2022/0171267 A1 | 6/2022 | Takano et al. | |
| 2022/0171268 A1 | 6/2022 | Hirakawa et al. | |
| 2022/0179298 A1 | 6/2022 | Fujita et al. | |
| 2022/0299852 A1 | 9/2022 | Nakamura et al. | |
| 2022/0342291 A1 | 10/2022 | Fujita et al. | |
| 2022/0345671 A1 | 10/2022 | Sasaki et al. | |

FOREIGN PATENT DOCUMENTS

| | | | | |
|---|---|---|---|---|
| JP | 2021-092761 | 6/2021 | | |
| WO | WO-2015145612 A1 * | 10/2015 | ......... | G03B 21/2073 |
| WO | WO 2016/166885 A1 | 10/2016 | | |

* cited by examiner

OPTICAL AXIS OF LASER 62

LIGHT SOURCE DEVICE

OPTICAL AXIS OF LASER BEAM 61

OPTICAL AXIS OF FLUORESCENT BEAM 72

OPTICAL AXIS OF FLUORESCENT BEAM 71

31

312                    311

SHORT
AXIS

SPOT OF
LASER
BEAM 62

LONG
AXIS

SPOT OF
LASER BEAM 61

LIGHT SOURCE DEVICE

LIGHT SOURCE DEVICE

FIG. 22B

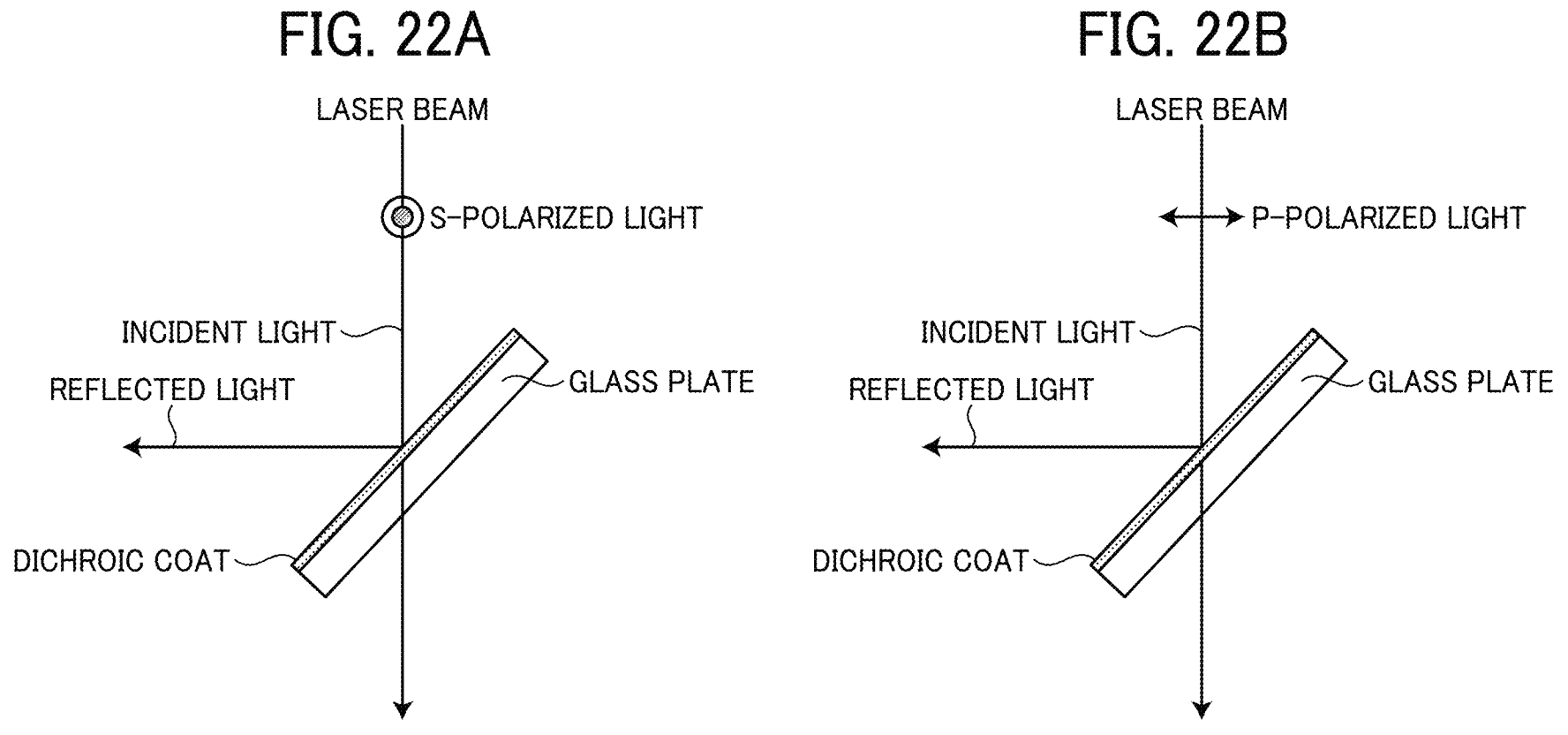

LASER BEAM

P-POLARIZED LIGHT

GLASS PLATE

INCIDENT LIGHT

REFLECTED LIGHT

DICHROIC COAT

FIG. 22A

LASER BEAM

S-POLARIZED LIGHT

GLASS PLATE

INCIDENT LIGHT

REFLECTED LIGHT

DICHROIC COAT

LIGHT-EMITTING SURFACE OF FIRST LASER SOURCE 11

LIGHT-EMITTING SURFACE OF SECOND LASER SOURCE 12

OPENING OF OPTICAL HOMOGENIZER

Figure 26A:
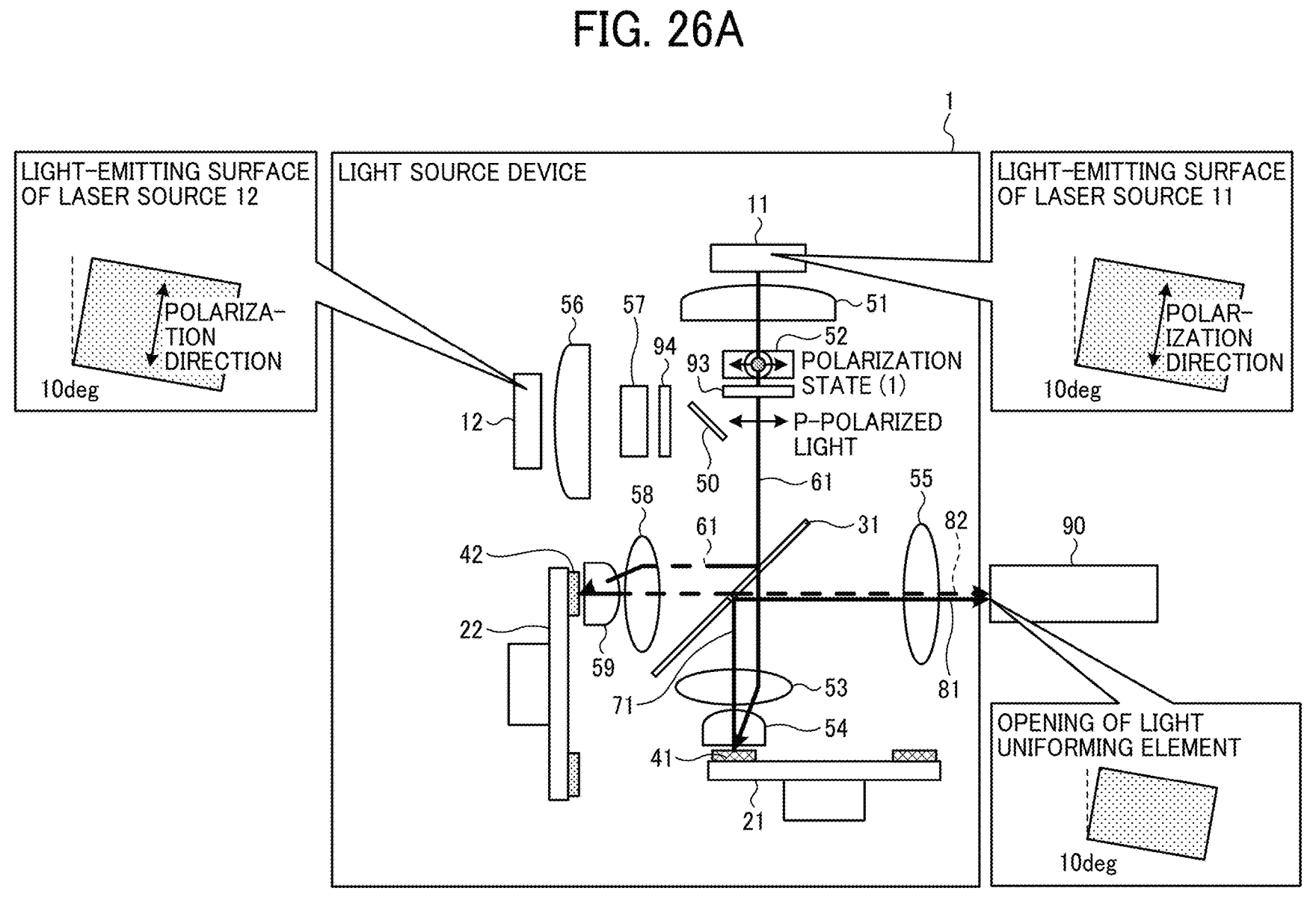

LIGHT-EMITTING SURFACE OF LASER SOURCE 11

POLARIZATION DIRECTION

10deg

LIGHT-EMITTING SURFACE OF LASER SOURCE 12

POLARIZATION DIRECTION

10deg

OPENING OF LIGHT UNIFORMING ELEMENT

10deg

LIGHT SOURCE DEVICE

1

POLARIZATION STATE (1)

P-POLARIZED LIGHT

LIGHT SOURCE DEVICE AND PROJECTION APPARATUS

CROSS-REFERENCE TO RELATED APPLICATIONS

This patent application is based on and claims priority pursuant to 35 U.S.C. § 119(a) to Japanese Patent Application No. 2022-018841, filed on Feb. 9, 2022, and Japanese Patent Application No. 2022-181040, filed on Nov. 11, 2022, in the Japan Patent Office, the entire disclosures of which are hereby incorporated by reference herein.

BACKGROUND

Technical Field

The present disclosure relates to a light source device and a projection apparatus.

Related Art

A light source device for use in projectors uses light sources that output light beams of red color, green color, yellow color, and blue color to generate a white color light beam. The light source device uses a solid-state light source, including a light emitting diode (LED) and a laser, as a light source.

However, solid-state light sources of, particularly green light, yellow light, and red light have poor luminous efficiency and temperature characteristics and have difficulties in serving as a bright projector. To deal with such issues, the technology that excites fluorescent material with a blue laser beam having high luminous efficiency has been widely used to generate colors as yellow, green, and red.

SUMMARY

An embodiment of the present disclosure provides a light source device including: a first light source configured to emit a first excitation beam; a second light source separate from the first light source, a second light source configured to emit a second excitation beam; an optical combiner configured to: reflect or transmit the first excitation beam; and reflect or transmit the second excitation beam; a first wavelength converter including a first phosphor to which the first excitation beam transmitted through the optical combiner enters and excites the first phosphor to cause the first phosphor to emit a first fluorescent beam proceeding in a first optical path; and a second wavelength convertor including a second phosphor to which the second excitation beam reflected by the optical combiner enters and excites the second phosphor to cause the second phosphor to emit a second fluorescent beam proceeding in a second optical path. The optical combiner is at a point at which the first optical path of the first fluorescent beam intersects the second optical path of the second fluorescent beam. The optical combiner is further configured to: combine the first fluorescent beam and the second fluorescent beam to generate a flux of a combination of the first fluorescent beam and the second fluorescent beam; and emit the flux of the combination in one emission direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11C is another illustration of the entire configuration of the light source device according to the fourth embodiment;

FIG. 12C is another illustration of the entire configuration of the light source device according to the fifth embodiment;

FIG. 13 is a collection of diagrams of optical spectra of light beams according to an embodiment of the present disclosure;

FIG. 16B is another illustration of the entire configuration of the light source device according to the sixth embodiment;

FIG. 16C is another illustration of the entire configuration of the light source device according to the sixth embodiment;

FIGS. 22A and 22B are illustrations for indicating the definition of the polarization direction of laser beams;

FIG. 26A is an illustration of the entire configuration of a light source device according to an eleventh embodiment;

FIG. 26B is an illustration of the entire configuration of the light source device according to the eleventh embodiment.

Figure 1A:
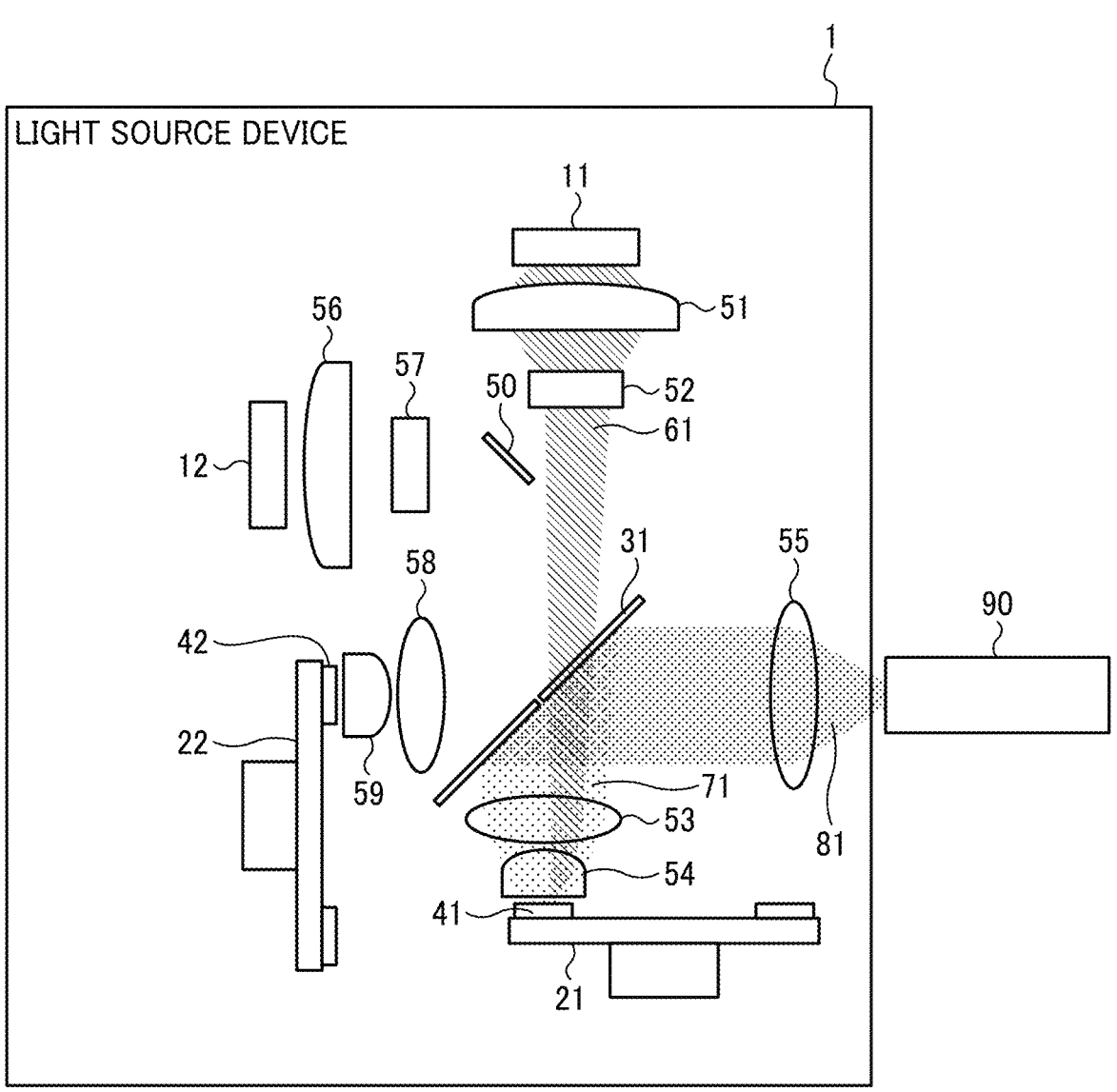
FIG. 1A is a diagram of a configuration of a light source device according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

A comparative example discloses the technology that uses two pairs of excitation light sources and phosphor wheels to provide a high-bright projector.

Another comparative example discloses the technology that makes the angular characteristics and intensity distribution uniform between fluorescent light beams emitted from two fluorescent materials by equalizing the optical-path lengths of the fluorescent light beams.

These technologies, however, might cause upsizing of the light source device as a whole because a first optical element that directs a fluorescent light beam emitted from fluorescent material that has received excited light to a subsequent stage is separate from a second optical element that combines fluorescent light beams emitted from two fluorescent materials.

Embodiments of the present disclosure achieve downsizing of a light source device.

Hereinafter, embodiments of a light source device and a projection apparatus will be described in detail with reference to the accompanying drawings.

FIRST EMBODIMENT

Figure 1B:
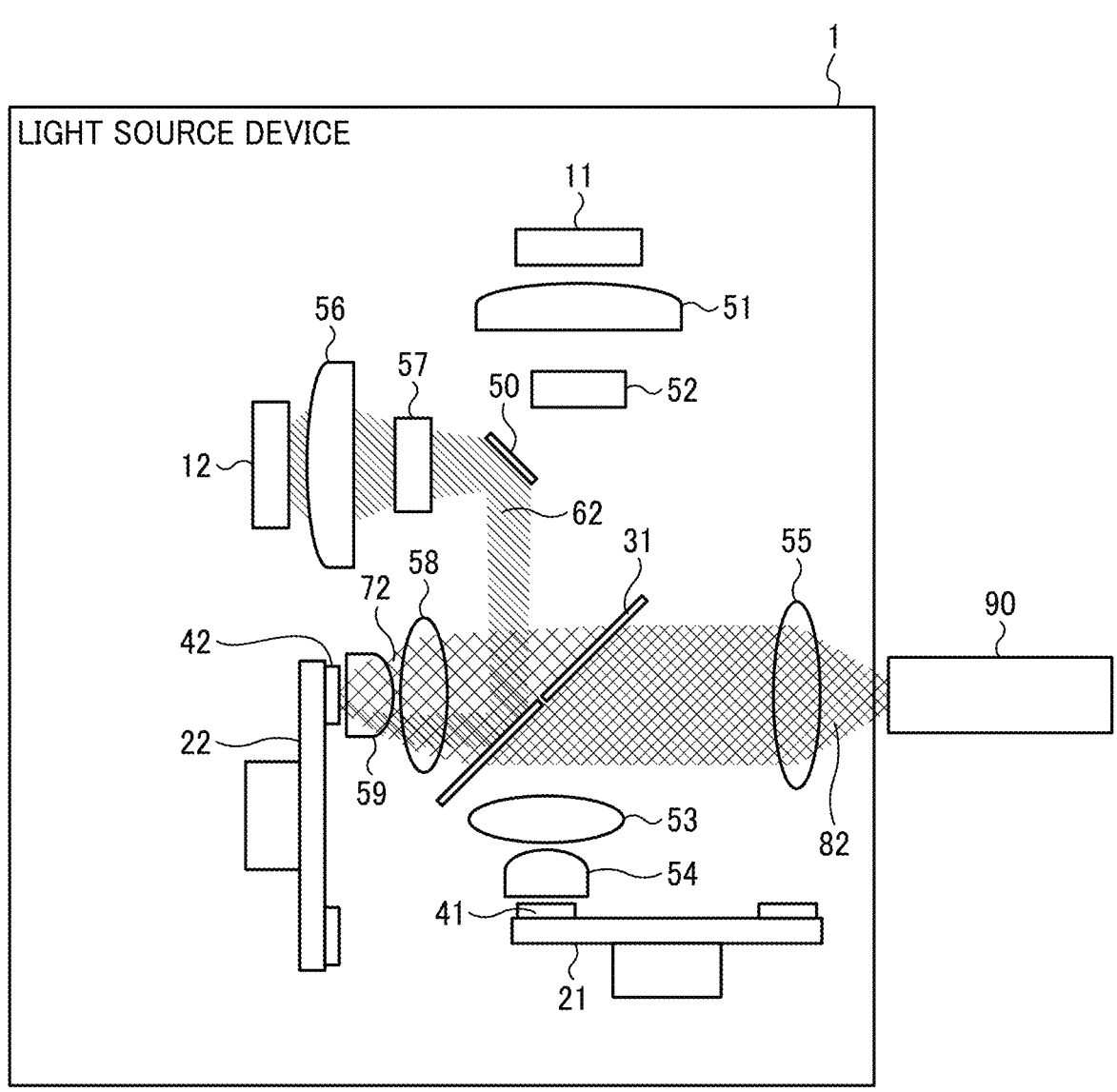
FIG. 1B is another diagram of the configuration of a light source device according to a first embodiment.
Figure 2:
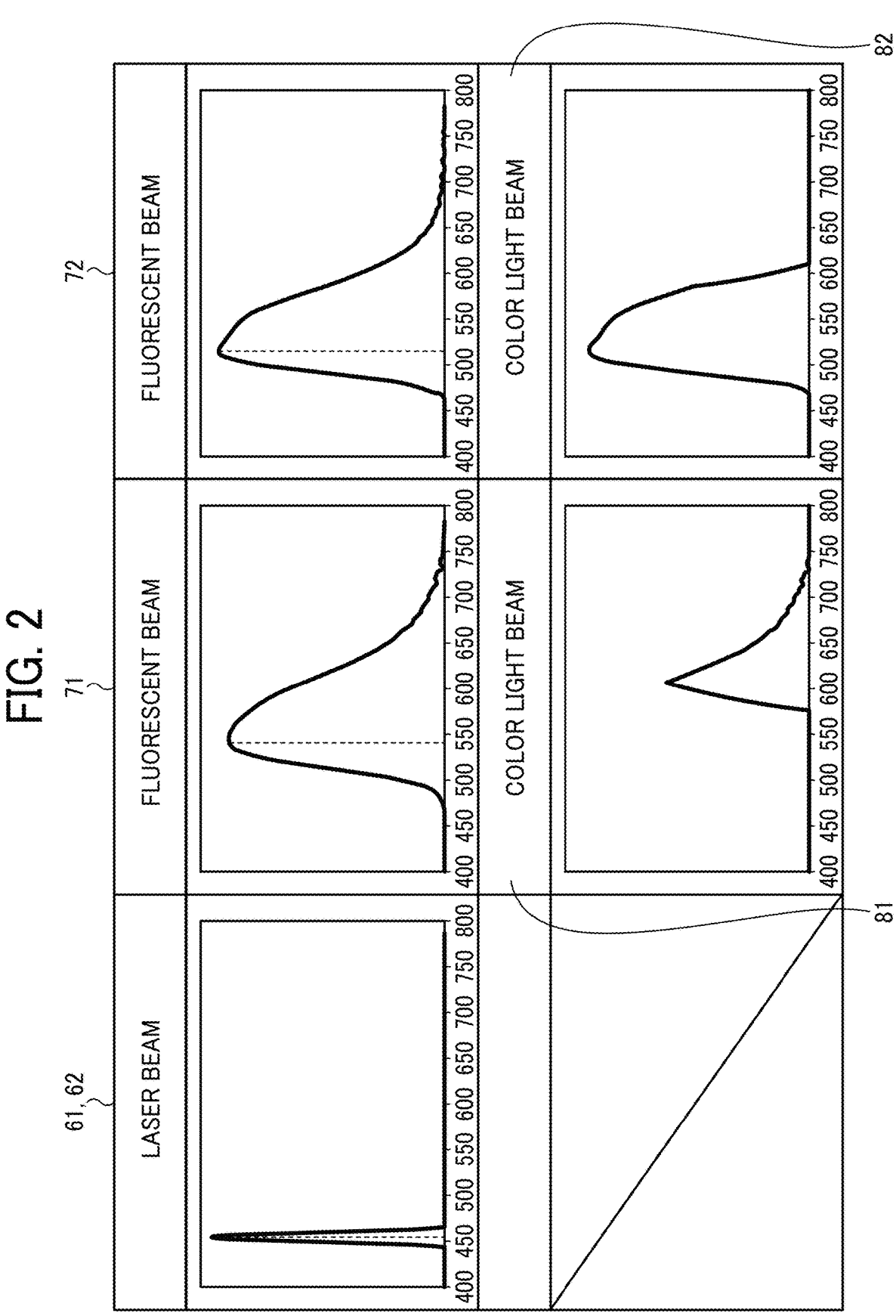
FIG. 2 is a collection of diagrams of optical spectra of light beams according to an embodiment of the present disclosure.

FIGS. 1A and 1B are diagrams of a configuration of a light source device 1 according to a first embodiment. FIG. 2 is a collection of graphs of the optical spectra of the respective light beams according to an embodiment of the present disclosure.

As illustrated in FIGS. 1A and 1B, the light source device 1 includes: two laser light sources (a first laser source 11 and a second laser source 12, which are collectively referred to simply as laser sources 11 and 12 when distinguished from each other) that emit laser beams; two phosphor wheels 21 and 22 provided with phosphors 41 and 42, each of which emits fluorescence when irradiated with a laser beam; and a beam splitting and combining element 31 that reflects or transmits any light (e.g, the laser beams (a first excitation beam and a second excitation beam) emitted from the first laser source 11 and the second laser source 12, respectively). As illustrated in FIGS. 1A and 1B, the beam splitting and combining element 31 is tilted to each optical path. As illustrated in FIGS. 1A and 1B, the light source device 1 emits light to the optical homogenizer 90. The optical homogenizer 90 mixes and homogenizes light incident thereon, emitting homogenized light. The optical homogenizer 90 is, for example, a light tunnel, a rod integrator, or a fly-eye lens.

The laser sources 11 and 12 are bule laser light sources with a peak wavelength of 455 nm, for example. The first laser source 11 (or a first light source) emits a blue laser beam (a first excitation beam), which passes through the beam splitting and combining element 31 (an optical combiner) and reaches the phosphor wheel 21 (a first wavelength converter) to thus excite the phosphor 41 on the phosphor wheel 21. The second laser source 12 (or a second light source) emits a blue laser beam (a second excitation beam), which reflects off a mirror 50 and the beam splitting and combining element 31 and reaches the phosphor wheel 22 (a second wavelength converter) to thus excite the phosphor 42 on the phosphor wheel 22.

Although all the laser sources used in the present embodiment are identical, no limitation is indicated therein. The laser sources 11 and 12 may be any laser sources that emit laser beams to finally excite the phosphors 41 and 42 of the phosphor wheels 21 and 22, respectively. Further, the laser sources 11 and 12 are not limited to laser sources and may be any light source that serves the above-described functions. In the present embodiment, different laser light sources are used for the phosphor wheels 21 and 22, respectively. Alternatively, one laser light source may be used, and one laser beam emitted from the one laser light source is separated by a beam splitting and combining element or another mirror into two optical paths to illuminate the phosphor wheels 21 and 22, respectively.

The phosphor wheels 21 and 22 each have a circular shape and are driven to rotate by a motor. The phosphor wheel 21 includes, on its reflecting layer, the phosphor 41 that emits fluorescence having its wavelength converted into a longer wavelength than that of the laser beam (the first excitation beam) striking on the phosphor wheel 21 when exposed to the laser beam. The phosphor wheel 22 includes, on its reflecting layer, the phosphor 42 that emits fluorescence having its wavelength converted into a longer wavelength than that of the laser beam (the second excitation beam) striking on the phosphor wheel 22 when exposed to the laser beam. When exposed to the blue laser beam emitted from the first laser source 11 and passed through the beam splitting and combining element 31, the phosphor 41 of the phosphor wheel 21 emits a first fluorescent beam 71.

When exposed to the blue laser beam emitted from the second laser source 12 and reflected off the mirror 50 and the beam splitting and combining element 31, the phosphor 42 of the phosphor wheel 22 emits a second fluorescent beam 72.

The first and second fluorescent beams reflects off the reflecting surfaces in the vertical direction that is vertical to the reflecting surfaces, respectively while having a Lambertian light distribution. The phosphor 41 of the phosphor wheel 21 is a yellow phosphor having a peak wavelength of approximately 540 nm, for example.

The phosphor 42 of the phosphor wheel 22 is a green phosphor having a peak wavelength of approximately 515 nm, for example.

Each of the phosphors 41 and 42 may be appropriately determined in accordance with the characteristics of light to be used as illumination light for a projector. For example, the phosphor 41 of the phosphor wheel 21 may be a red phosphor having a peak wavelength of approximately 610 nm. Alternatively, the same phosphor may be used for the phosphor 41 of the phosphor wheel 21 and the phosphor 42 of the phosphor wheel 22.

In the present embodiment, the circular phosphor wheels 21 and 22, which are driven to rotate by a motor, are used. However, no limitation is indicated thereby. Alternatively, the phosphor wheels 21 and 22 may be, for example, a fixed phosphor that is directly attached to a radiator plate. However, each of the phosphors 41 and 42 increases in temperature when emitting fluorescence. To deal with the increase in temperature, the phosphor wheels 21 and 22 are rotated to produce a cooling effect.

Figure 3A:
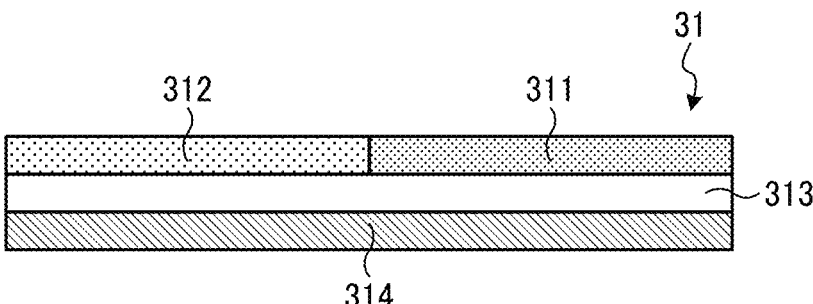
FIGS. 3A and 3B are illustrations of a configuration of a beam splitting and combining element.
Figure 3B:
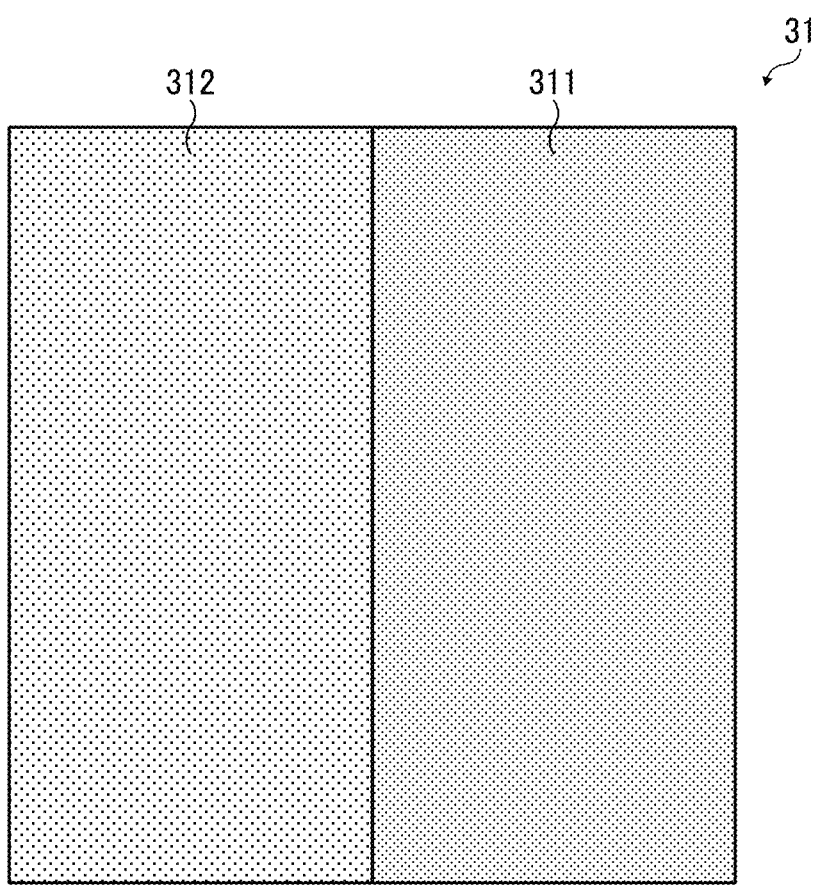

FIGS. 3A and 3B are illustrations of a configuration of a beam splitting and combining element 31. FIG. 3A is a side view of the configuration of the beam splitting and combining element 31. FIG. 3B is a plan view of the configuration of the beam splitting and combining element 31.

As illustrated in FIGS. 3A and 3B, the beam splitting and combining element 31 is, for example, a dichroic mirror. The dichroic mirror (the beam splitting and combining element 31) includes a dichroic filter layer 311 (also referred to as a first component or a first area) and a dichroic filter layer 312 (also referred to as a second component or a second area) at one surface. The dichroic filter layer 311 receives the blue laser beam (the first excitation beam) emitted from the first laser source 11. The dichroic filter layer 312 receives the blue laser beam (the second excitation beam) emitted from the second laser source 12.

More specifically, the beam splitting and combining element 31 includes a glass plate 313 capable of transmitting, for example, visible light. The glass plate 313 has one surface divided into two areas: the first area and the second area (see FIG. 3B). The dichroic filter layer 311 (or the first component) is disposed in the first area, whereas the dichroic filter layer 312 (or the second component) is disposed in the second area. Both of the dichroic filter layer 311 and the dichroic filter layer 312 have the property of transmitting or reflecting a desired wavelength of light.

The beam splitting and combining element 31 includes an antireflection (AR) coat 314 on another surface of the glass plate 313. A surface of the glass plate 313, as it is, has a reflectance of several percent. To reduce light loss due to the reflectance of the glass plate 313, the AR coat 314 on the glass plate 313 serves to reduce the reflectance to 1% or less.

The dichroic filter layer 311 and the dichroic filter layer 312 are preferably arranged with no interval therebetween to increase the light utilization efficiency. However, the dichroic filter layer 311 and the dichroic filter layer 312 may be arranged with an interval therebetween. In this case, the interval between the dichroic filter layer 311 and the dichroic filter layer 312 is set to 0.1 mm or less to allow the light utilization efficiency to not substantially decrease.

The beam splitting and combining element 31 may have another configuration different from the configuration in FIGS. 3A and 3B.

Figure 4A:
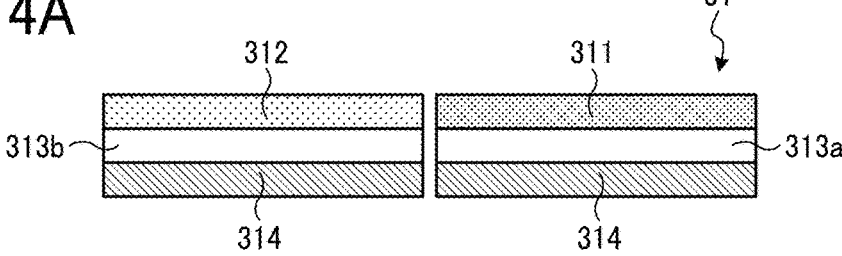
FIGS. 4A and 4B are illustrations of another configuration of the beam splitting and combining element according to a modification of the embodiment of the present disclosure.
Figure 4B:
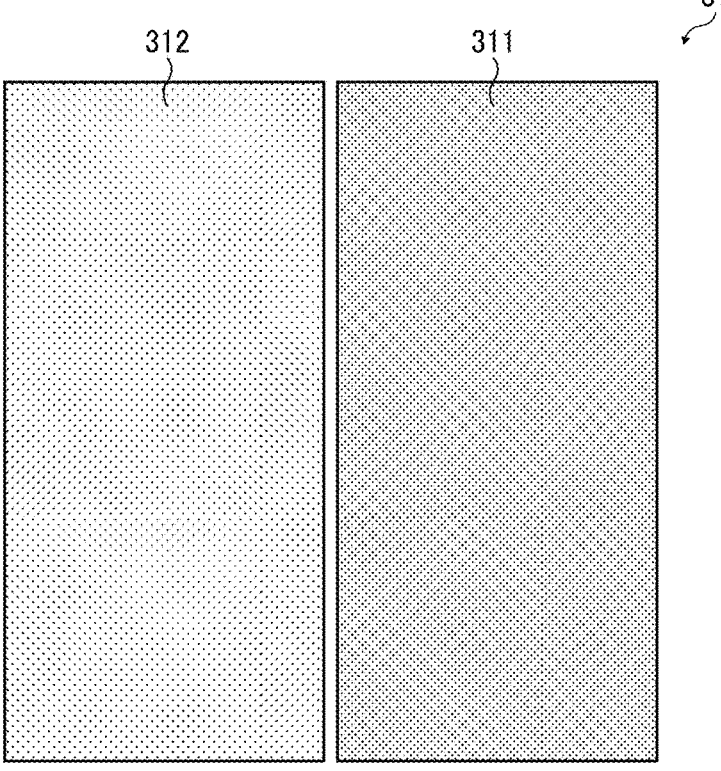

FIGS. 4A and 4B are illustrations of another configuration of the beam splitting and combining element 31 according to a modification of an embodiment of the present disclosure. FIG. 4A is a side view of the configuration of the beam splitting and combining element 31. FIG. 4B is a plan view of the configuration of the beam splitting and combining element 31.

As illustrated in FIGS. 4A and 4B, the beam splitting and combining element 31 includes a glass plate 313a and a glass plate 313b separate from each other. The glass plate 313a has a dichroic filter layer 311 thereon, whereas the glass plate 313b has a dichroic filter layer 312 thereon. The two glass plates 313a and 313b are mechanically held.

In this case as well, the interval between the dichroic filter layer 311 and the dichroic filter layer 312 is preferably 0.1 mm or less to allow successful light utilization efficiency.

The transmittance optical spectra (or the transmittance spectra) of the dichroic filter layer 311 and the dichroic filter layer 312 may be appropriately determined in accordance with the characteristics of light to be used for a projector.

The optical spectra refer to the light-emitting property representing a light intensity for each wavelength of light emitted from a light source.

Figure 5:
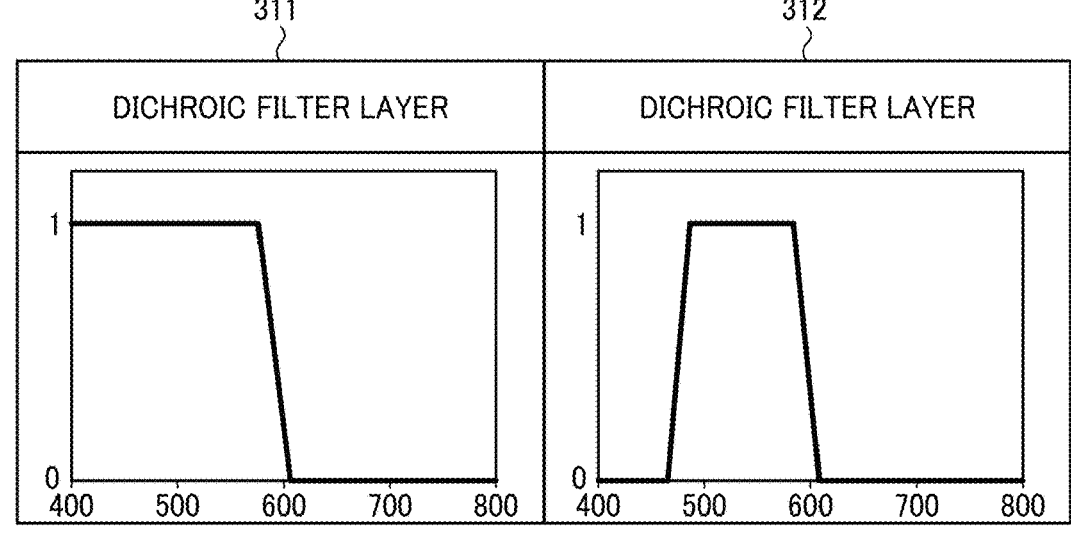
FIG. 5 indicates graphs of the transmittance spectra of a dichroic filter layer and a dichroic filter layer, respectively of the beam splitting and combining element, according to an embodiment of the present disclosure.

FIG. 5 indicates graphs of the transmittance spectra of the dichroic filter layer 311 and the dichroic filter layer 312, respectively of the beam splitting and combining element 31, according to an embodiment of the present disclosure. In FIG. 5, light in a wavelength range for which the value of the vertical axis is 1 is transmitted through the dichroic filter layer, whereas light in a wavelength range for which the value of the vertical axis is 0 reflects off the dichroic filter layer.

The transmittance may not be 100% or 0%.

In the present embodiment, the dichroic filter layer 311 of the beam splitting and combining element 31 reflects only light in a red wavelength of approximately 610 nm or greater and transmits light in a wavelength range out of the red wavelength range as indicated by the transmittance spectrum of the dichroic filter layer 311 in FIG. 5.

Further, in the embodiment, the dichroic filter layer 312 of the beam splitting and combining element 31 reflects only light in a green wavelength of approximately 475 nm to 600 nm and transmits light in a wavelength range out of the green wavelength range as indicated by the transmittance spectrum of the dichroic filter layer 312 in FIG. 5.

In other words, the dichroic filter layer 311 as the first area transmits the blue laser beam (the first excitation light) emitted from the first laser light source 11, and the dichroic filter layer 312 as the second area reflects the blue laser beam (the second excitation light) emitted from the second laser source 12.

In the present embodiment, the polarization direction of the first excitation light with respect to the dichroic filter layer 311 is substantially parallel to the plane of incidence thereon (i.e., the first excitation light is substantially P-polarized light), and the polarization direction of the second excitation light with respect to the dichroic filter layer 312 is substantially perpendicular to the plane of incidence thereon (i.e., the second excitation light is substantially S-polarized light).

As illustrated in FIGS. 1A and 1B, the light source device 1 includes positive lenses 51 and 56 and negative lenses 52 and 57. These lenses serve to substantially collimate laser beams and also serve to narrow the flux of the laser beams.

The lenses 51 and 52 constitute a first beam narrowing element that narrows a laser beam 61 proceeding to strike on the beam splitting and combining element 31.

The lenses 56 and 57 constitute a second beam narrowing element that narrows a laser beam 62 proceeding to strike on the beam splitting and combining element 31. The light source device 1 further includes positive lenses 53 and 58 and negative lenses 54 and 59. These lenses serve to converge the laser beams onto the phosphors 41 and 42 and substantially collimate the first fluorescent beam 71 and the second fluorescent beam 72.

The lenses 53 and 54 constitute a first refractor that converges the laser beam 61 onto the phosphor 41 of the phosphor wheel 21 and substantially collimates the first fluorescent beam 71.

The lenses 58 and 59 constitute a second refractor that converges the laser beam 62 onto the phosphor 42 of the phosphor wheel 22 and substantially collimates the second fluorescent beam 72.

The light source device 1 further includes a positive lens 55 that serves to converge light onto the optical homogenizer 90 to allow the light to enter the optical homogenizer 90 effectively.

These lenses 51 to 59 have a lens configuration that increases light utilization efficiency as much as possible in an optical path from the first laser source 11 to the optical homogenizer 90 and another optical path from the second laser source 12 to the optical homogenizer 90. However, no limitation is intended therein.

The light source device 1 of the present embodiment serves to cause the first excitation beam and the second excitation beam to strike on the phosphors 41 and 42 and direct the first fluorescent beam 71 and the second fluorescent beam 72 emitted from the phosphors 41 and 42 to the subsequent optical system. Further, the light source device 1 of the present embodiment serves to combine the first fluorescent beam 71 and the second fluorescent beam 72 together. The optical elements of the light source device 1 are arranged to allow one optical element to serve to direct the first fluorescent beam 71 and the second fluorescent beam 72 to the subsequent optical system as well as combine the first fluorescent beam 71 and the second fluorescent beam 72 together.

Figure 6:
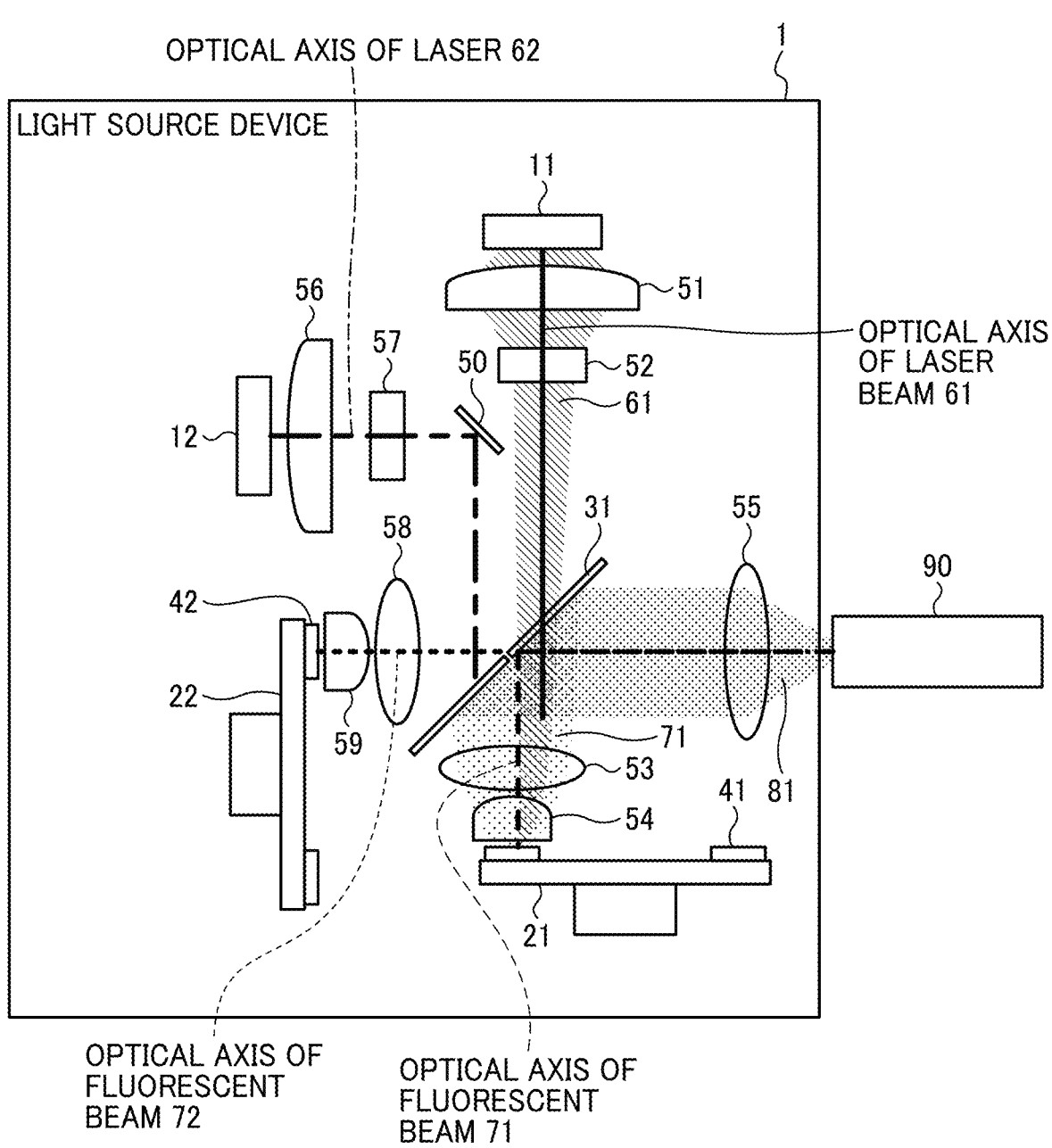
FIG. 6 is an illustration of an optical axis of each laser beam or each element in the light source device in FIGS. 1A and 1B.

FIG. 6 is an illustration of an optical axis of each laser beam or each element in the light source device 1. As illustrated in FIG. 6, in the light source device 1, the first optical axis of the first laser source 11 and the lenses 51 and 52 is offset from the optical axis of the second laser source 12 and lenses 56 and 57 to cause the laser beam 61 and the laser beam 62 to respectively strike on a first position and a second position different from the first position on the beam splitting and combining element 31, so as to separate the laser beam 61 and the laser beam 62 into different directions.

The optical axis of the lens refers to a virtual straight line that coincides with the axis of rotational symmetry of the lens. The optical axis of the light source refers to a straight line vertically connecting the light-emitting surface of the light source and the center of a projected image. The center of the projection image is defined by the center of a minimum circumscribed circle of an intensity distribution within the projection range of the light source, which is projected onto the optical element immediately subsequent to the light source.

This arrangement of the light sources causes the laser beam 61 to strike on the dichroic filter layer 311 of the beam splitting and combining element 31 and the laser beam 62 to strike on the dichroic filter layer 312 of the beam splitting and combining element 31. Further, the optical axes of the first fluorescent beam 71 and the second fluorescent beam 72 are aligned in the light source device 1 to efficiently combine the two fluorescent beams 71 and 72 together. To align the optical axes of the fluorescent beam 71 and the second fluorescent beam 72, the optical axes of the phosphor 41 and the lenses 53 and 54 and the optical axes of the phosphor 42 and the lenses 58 and 59 are Therefore, as shown in FIG. 6, in the light source device 1, the optical the optical axis of the phosphor 41 to the lens 53 and the optical axis of the phosphor 42 to the lens 58 are aligned together.

Further, a point of intersection of the optical axis of the phosphor 41 and the lenses 53 and 54 and the optical axis of the phosphor 42 and the lenses 58 and 59 is substantially on the boundary between the dichroic filter layer 311 and the dichroic filter layer 312 of the beam splitting and combining element 31.

The laser beam 61 emitted from the first laser source 11 comes to enter the lens 53 in a direction offset from the optical axis of the lenses 53 and 54, and then is caused by the refractive power of the lenses 53 and 54 to approach the optical axis of the lenses 53 and 54 at an angle and thus converge onto the phosphor 41. The same applies to the laser beam 62 emitted from the second laser source 12.

The following describes each optical path in the light source device 1.

As illustrated in FIG. 1A, the laser beams 61 emitted from the first laser source 11 turn a thin and substantially collimated beam after passing through the lenses 51 and 52 and pass through the dichroic filter layer 311 on the beam splitting and combining element 31, thus striking on the phosphor 41 on the phosphor wheel 21. The phosphor 41 of phosphor wheel 21 is excited by the laser beam 61 striking on the phosphor 41 and emits first fluorescent beam 71.

The first fluorescent beam 71 is emitted from the phosphor 41 to the beam splitting and combining element 31 with the Lambert light distribution. The first fluorescent beam 71 strikes on the dichroic filter layer 311 and the dichroic filter layer 312 so that a light beam in a certain wavelength band, particularly, a red-color wavelength band reflects off the dichroic filter layer 311 and the dichroic filter layer 312 because of the characteristics thereof and proceed to the optical homogenizer 90.

As illustrated in FIG. 1B, the laser beam 62 emitted from the second laser source 12 turns a thin and substantially collimated beam after passing through the lenses 56 and 57, reflects off the mirror 50, and passes through the dichroic filter layer 312 on the beam splitting and combining element 31, thus striking on the phosphor 42 on the phosphor wheel 22. The phosphor 42 of phosphor wheel 22 is excited by the laser beam 62 striking on the phosphor 42 and emits second fluorescent beam 72.

The second fluorescent beam 72 is emitted from the phosphor 42 to the beam splitting and combining element 31 with the Lambert light distribution. The second fluorescent beam 72 strikes on the dichroic filter layer 311 and the dichroic filter layer 312 so that a light beam in a certain wavelength band, particularly, a green-color wavelength band is transmitted through the dichroic filter layer 311 and the dichroic filter layer 312 because of the characteristics thereof and proceeds to the optical homogenizer 90.

The dichroic filter layers 311 and 312 of the beam splitting and combining element 31 have different coating properties and characteristics, but both of them reflect the red light in a wavelength range of 600 nm or greater. The red light reflected by the dichroic filter layer 311 and the red light reflected by the dichroic filter layer 312 are combined to form a color light beam 81. The same applies to the relation between the first fluorescent beam 72 and the dichroic filter layer 311.

In the present embodiment, the mirror 50 is used to reduce the size of the light source device 1. Alternatively, the light source device 1 is configured to allow the laser beam 62 emitted from the lens 57 to go straight to the beam splitting and combining element 31.

In the present embodiment, the laser beam 61 emitted from the first laser light source 11 is caused to strike on the lens 53 with the optical axis of the laser beam 61 offset from the optical axis of the lenses 53 and 54. With an excessive increase in the amount of shift, the laser beam 61 may have its spot shape distorted on the phosphor 41 of the phosphor wheel 21 or may strike on the ends of the lenses 53 and 54, resulting in a lower light utilization efficiency.

In order to reduce the amount of shift as much as possible, the spot diameter of the laser beam 61 and the spot diameter of the laser beam 62 are made as close to each other as possible.

Figure 7:
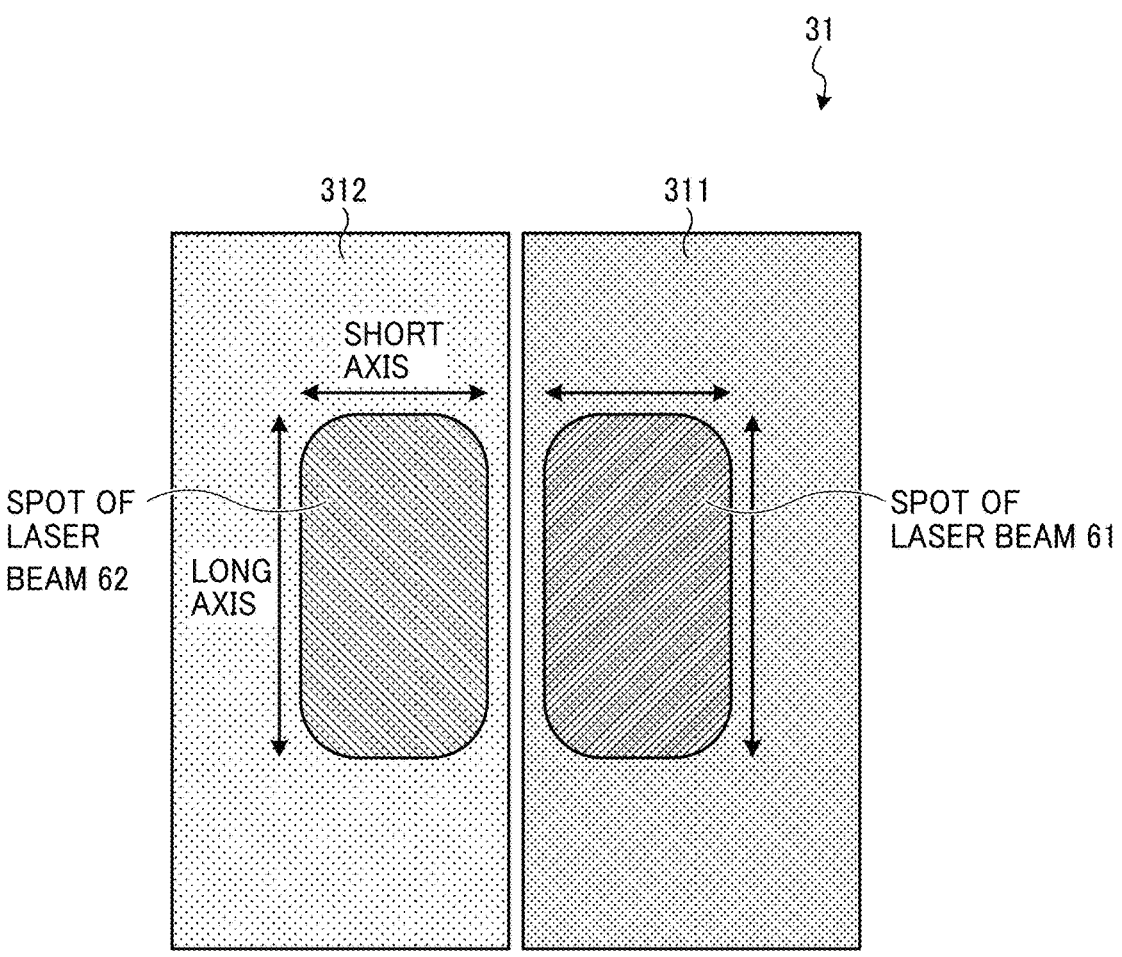
FIG. 7 is an illustration of laser spot positions on the beam splitting and combining element, according to an embodiment of the present disclosure.

FIG. 7 is an illustration of laser spot positions on the beam splitting and combining element 31, according to an embodiment of the present disclosure. As illustrated in FIG. 7, the spots of the laser beams 61 and 62 on the beam splitting and combining element 31 are often rectangular or elliptical.

It is assumed that the longer spot diameter is the major axis (or a long axis in FIG. 7), and the shorter spot diameter is the minor axis (or a short axis in FIG. 7). The spot diameters of the laser beams 61 and 62 are brought closer to each other by making the major axis substantially parallel to the boundary between the dichroic filter layer 311 and dichroic filter layer 312.

As described above, the present embodiment provides a compact optical device by allowing one beam splitting and combining element 31 to both direct the fluorescent beams 71 and 72 emitted from the phosphors 41 and 42 upon receiving excitation beams, respectively to a subsequent optical system and combine the fluorescent beams 71 and 72 together.

As described above, the beam splitting and combining element 31 further serves to select color of light to be used as illuminating light. The color of light used as illuminating light is not limited to the case described above, and can be determined by setting the transmittance spectra of the dichroic filter layer 311 and 312 on the beam splitting and combining element 31 in any desired manner.

For example, a region where the transmittance spectra becomes zero (0) in the dichroic filter layer is reduced to obtain a color light beam 82 with a higher color purity. As described above, the spectrum of the light source and the transmittance spectrum of the dichroic filter layer can be designed according to the optical spectrum of light to be used. Using a color wheel involves the use of a motor for rotating the color wheel and faces another challenge in terms of lifetime and noise. Among the elements used in the projector, the motor has the shortest life and becomes a bottleneck in the lifetime of the projector.

In the present situation, a phosphor wheel is often used together with a color wheel, and the phosphor wheel becomes a bottleneck in lifetime because more heat is applied. However, since many fixed phosphors that do not use a motor have been developed, it is expected that the fixed phosphors will become mainstream in the future. In this case, it is considered that the merit of the system of the present disclosure in which the color wheel is not used is further obtained.

A color wheel further faces another challenge in terms of an angle of incidence upon the dichroic filter. The color wheel is typically disposed at a position at which light is converged (or a position at which a spot of light becomes small) in order to reduce a time during which light of two colors is mixed as much as possible.

Since the light is to be condensed by a lens in order to narrow the light, the light is incident on the color wheel at various angles. Since the dichroic filter is usually designed on the assumption that light is incident at any incident angle, if light is incident at an incident angle different from the desired incident angle, the optical spectrum characteristic of transmission changes.

When the light is incident at various angles as described above, the light used as the illuminating light does not have a desired optical spectrum characteristic, and the brightness is lowered. In an embodiment of the present disclosure, there is no need to converge the light beam when the light beam passes through the dichroic filter, and all the rays of the light beam strike on the dichroic filter at desired angles (designed values). This does not cause the described-above issues.

SECOND EMBODIMENT

A second embodiment is described below.

In the second embodiment, the beam splitting and combining element 31 has a configuration different from that of the first embodiment. In the following description of the second embodiment, the description of the same configurations as in the first embodiment will be omitted, and those different from the first embodiment will be described.

Figure 8A:
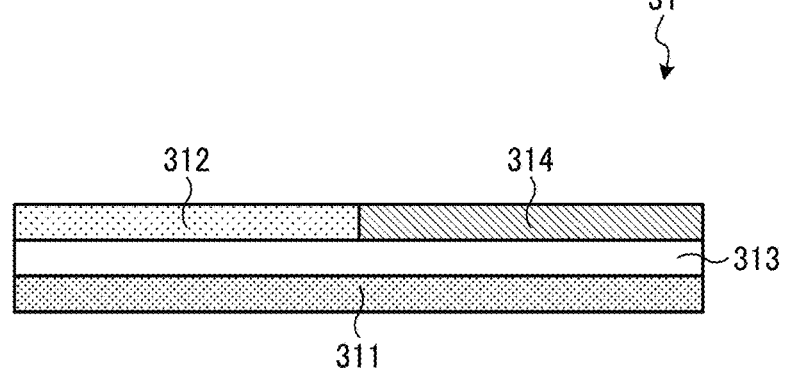
FIGS. 8A and 8B are illustrations of the configuration of a beam splitting and combining element of a light source device according to a second embodiments of the present disclosure.
Figure 8B:
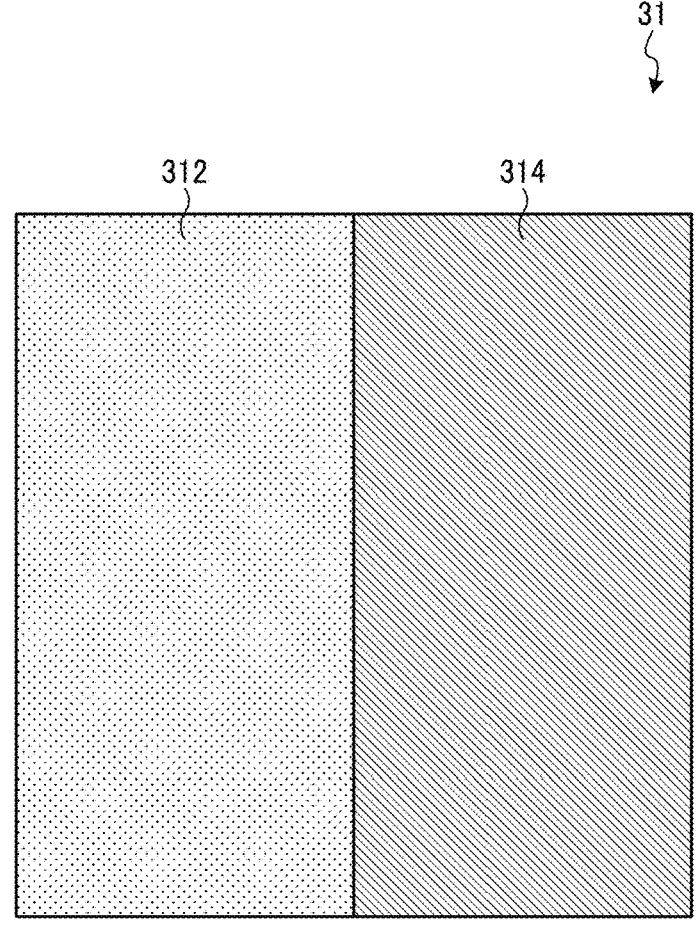

FIG. 8 is an illustration of the configuration of a beam splitting and combining element 31 of a light source device 1, according to a second embodiments of the present disclosure. FIG. 8A is a side view of the configuration of the beam splitting and combining element 31. FIG. 8B is a plan view of the configuration of the beam splitting and combining element 31. As illustrated in FIGS. 8A and 8B, the beam splitting and combining element 31 of the light source device 1 according to the present embodiment includes a glass plate 313 capable of transmitting, for example, visible light. The glass plate 313 has one surface divided into two areas (see FIG. 8B). A dichroic filter layer 312 is disposed in one area of the two areas, whereas an AR coat 314 as an antireflection coat is disposed in the other area. The dichroic filter layer 312 has the properties of transmitting or reflecting a desired wavelength of light.

The glass plate 313 of the beam splitting and combining element 31 has a dichroic filter layer 311 over the entire back surface of the glass plate 313.

Figure 9:
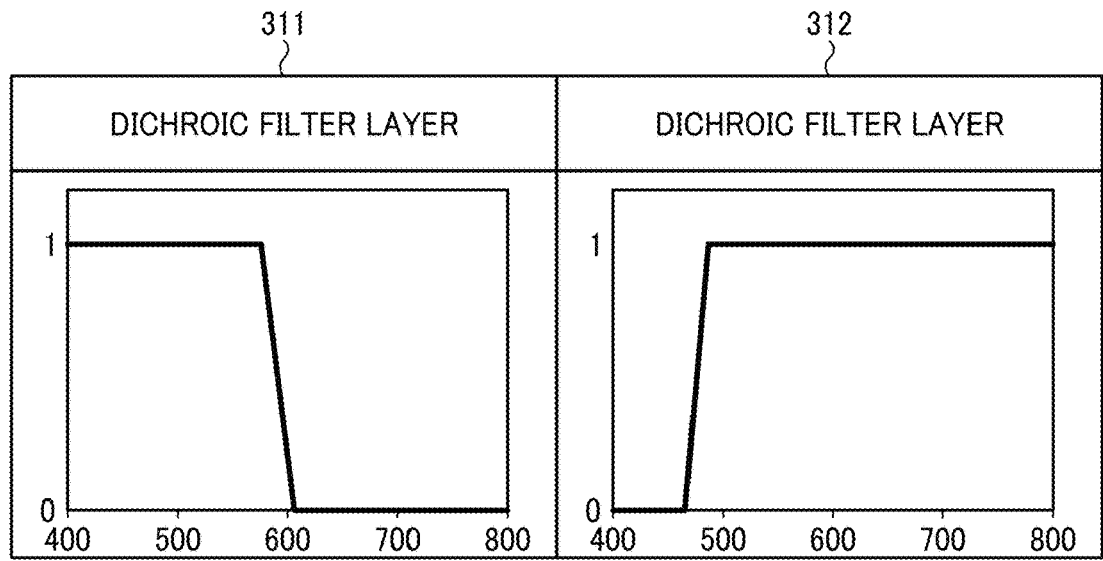
FIG. 9 indicates graphs of the transmittance spectra of a dichroic filter layer and a dichroic filter layer, respectively of the beam splitting and combining element, according to an embodiment of the present disclosure.

FIG. 9 indicates graphs of the transmittance spectra of the dichroic filter layer 311 and the dichroic filter layer 312, respectively of the beam splitting and combining element 31, according to an embodiment of the present disclosure. In FIG. 9, light in a wavelength range for which the value of the vertical axis is 1 is transmitted through the dichroic filter layer, whereas light in a wavelength range for which the value of the vertical axis is 0 reflects off the dichroic filter layer.

In the present embodiment, the dichroic filter layer 311 of the beam splitting and combining element 31 reflects only light in a red wavelength of approximately 610 nm or greater and transmits light in a wavelength range out of the red wavelength range as indicated by the transmittance spectrum in FIG. 9.

In the present embodiment, the dichroic filter layer 312 of the beam splitting and combining element 31 reflects only light in a blue wavelength of approximately 470 nm or greater and transmits light in a wavelength range out of the red wavelength range as indicated by the transmittance spectrum in FIG. 9.

The light source device 1 incorporating the beam splitting and combining element 31 with the above configuration produces resultant color light beams 81 and 82, which are the same as those in the first embodiment.

More specifically, the laser beam 61 emitted from the first laser source 11 passes through the AR coat 314 and the dichroic filter layer 311 and strikes on the phosphor 41. The color light beam 81 mainly containing red color out of the first fluorescent beam 71 emitted from the phosphor 41 reflects off the dichroic filter layer 311, proceeding to the optical homogenizer 90.

The laser beam 62 emitted from the second laser source 12 reflects off the dichroic filter layer 312 and proceeds to strike on the phosphor 42. The second fluorescent beam 72 emitted from the phosphor 42 passes through the dichroic filter layer 312 and the AR coat 314, and only the color light beam 82 mainly containing green color passes through the dichroic filter layer 311, proceeding to the optical homogenizer 90.

As described above, the present embodiment produces any desired light beam irrespective of the transmittance or position of the dichroic filter layers.

Further, a band-pass filter such as the dichroic filter layer described in the first embodiment may be difficult to manufacture or may be more costly than a low-pass filter or a high-pass filter. In the present embodiment, since the dichroic filter layer can be configured to use only a high-pass filter and a low-pass filter, the cost of the light source device can be reduced.

THIRD EMBODIMENT

A third embodiment will be described.

The third embodiment is different from the first embodiment in that the dichroic filter layers 311 and 312 of the beam splitting and combining element 31 are not disposed in the same plane of a glass plate (i.e., the dichroic filter layer 311 and the dichroic filter layer 312 are respectively on glass plates separate from each other).

In the following description of the third embodiment, the description of the same configurations as in the first embodiment will be omitted, and those different from the first embodiment will be described.

Figure 10A:
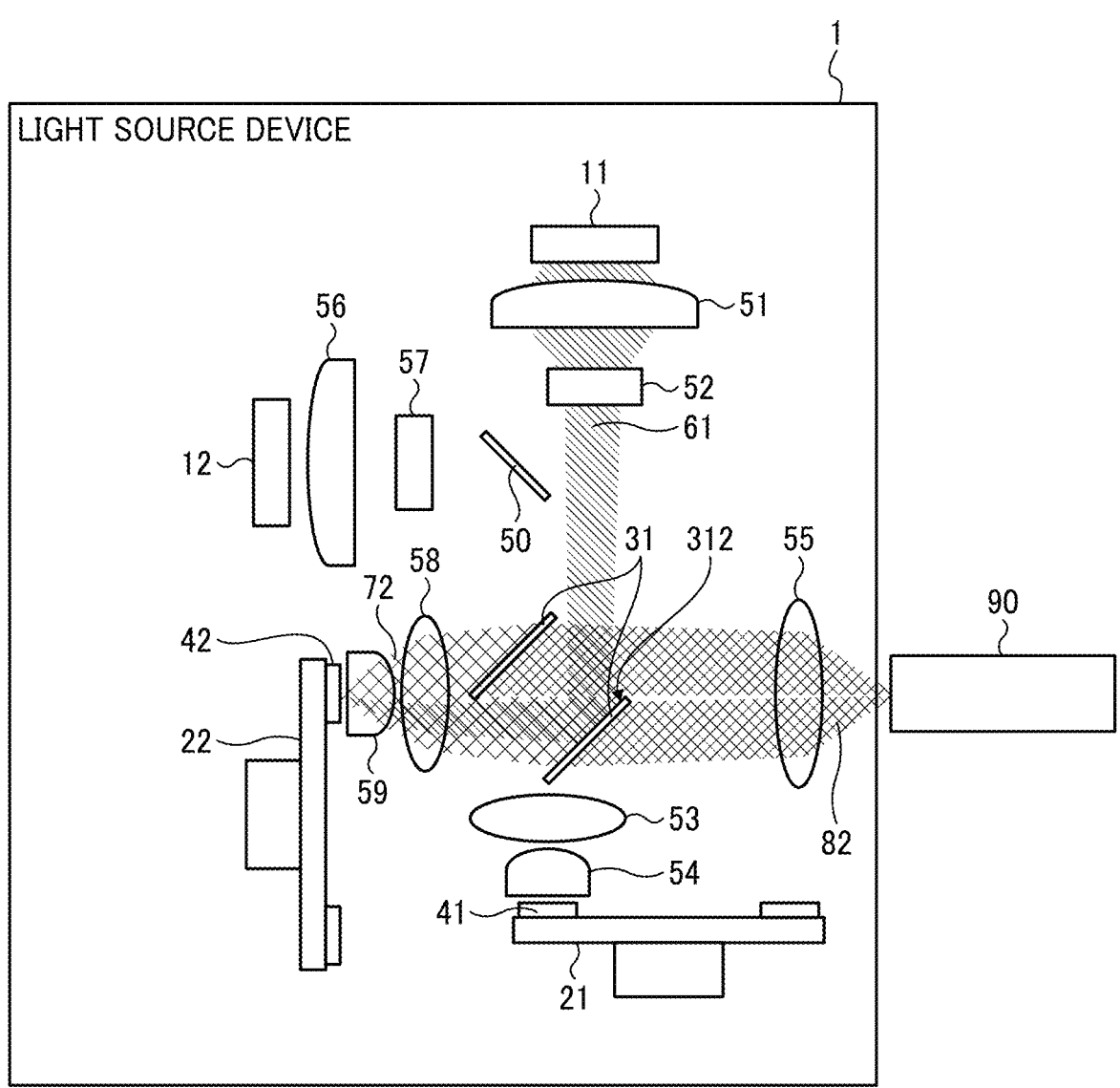
FIG. 10A is an illustration of the entire configuration of a light source device according to a third embodiment.
Figure 10B:
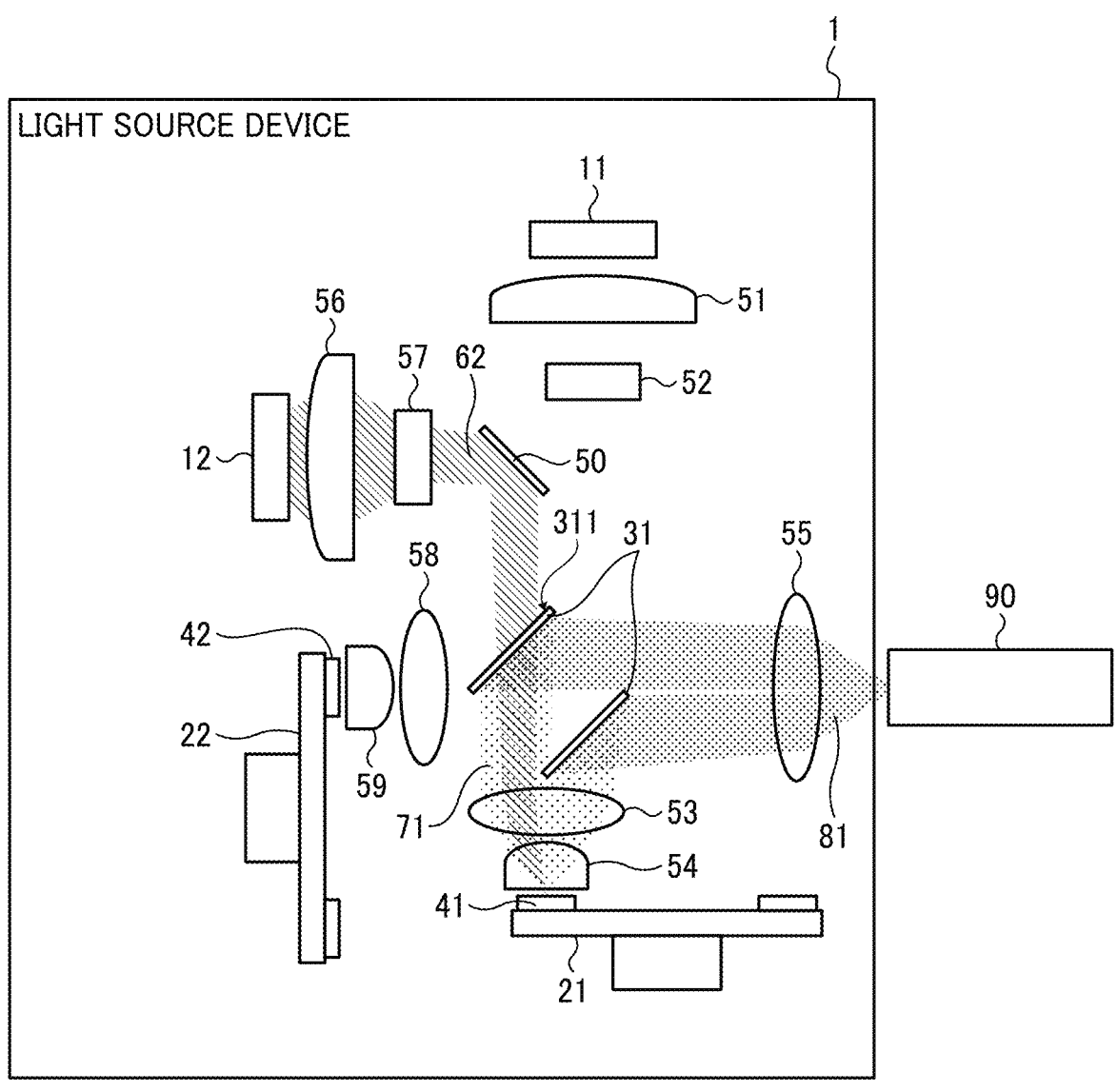
FIG. 10B is another illustration of the entire configuration of the light source device according to the third embodiment.

FIGS. 10A and 10B are illustrations of the configuration of a light source device 1 according to the third embodiment. As illustrated in FIGS. 10A and 10B, the light source device 1 of the present embodiment differs from the configuration of the first embodiment in that the dichroic filter layer 311 and the dichroic filter layer 312 of the beam splitting and combining element 31 are respectively on a glass plate 314a and a glass plate 314b, which are not on the same plane, meaning that the glass plate 314a and the glass plate 314b are separate from each other.

In this configuration, the laser beam 61 emitted from the first laser source 11 reflects off the dichroic filter layer 312 and proceeds to strike on the phosphor 42, whereas the laser beam 62 emitted from the second laser source 12 passes through the dichroic filter layer 311 and proceeds to strike on the phosphor 41.

The light source device 1 with such a configuration produces resultant color light beams 81 and 82, which are the same as those in the first embodiment.

In some examples as in the present embodiment, the dichroic filter layer 311 and the dichroic filter layer 312 of the beam splitting and combining element 31 are not on the same plane, and may be arranged in any manner that allows the light source device 1 to produce desired illuminating light.

Such a configuration of the present embodiment, in which the dichroic filter layer 311 and the dichroic filter layer 312 are not on the same plane, prevents the two mirrors provided with the dichroic filter layers 311 and 312 from rubbing against each other and becoming chipped while being held in contact with each other in actual manufacturing.

FOURTH EMBODIMENT

A second embodiment will be described.

The fourth embodiment differs from the first embodiment in that the optical axis of the second laser source 12 is offset from the optical axis of the first laser light source 11 in a direction perpendicular to the drawing direction (i.e., a direction orthogonal to the drawing sheet). In the following description of the fourth embodiment, the description of the same configurations as in the first embodiment will be omitted, and those different from the first embodiment will be described.

Figure 11A:
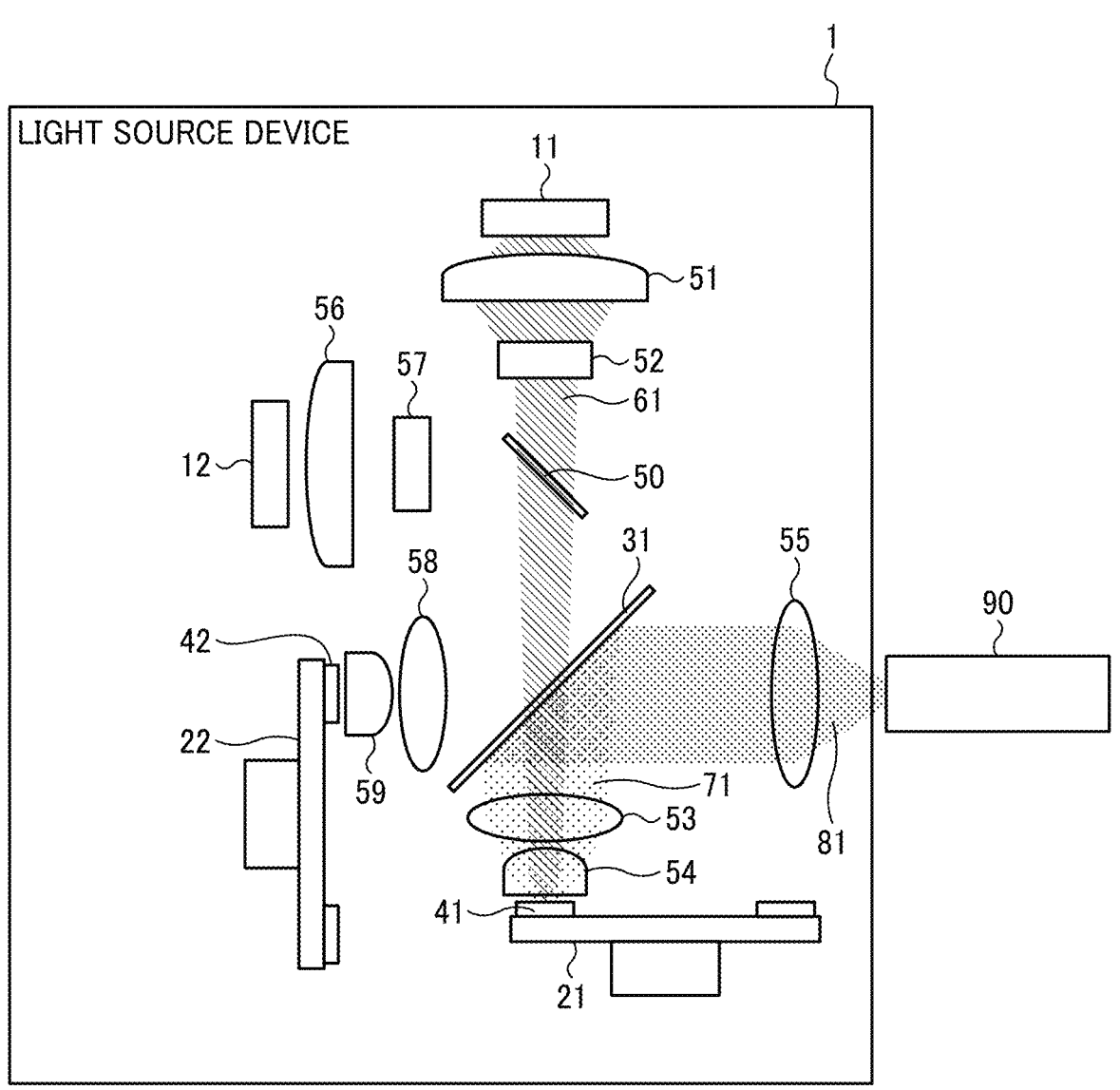
FIG. 11A is an illustration of the entire configuration of a light source device according to a fourth embodiment.
Figure 11B:
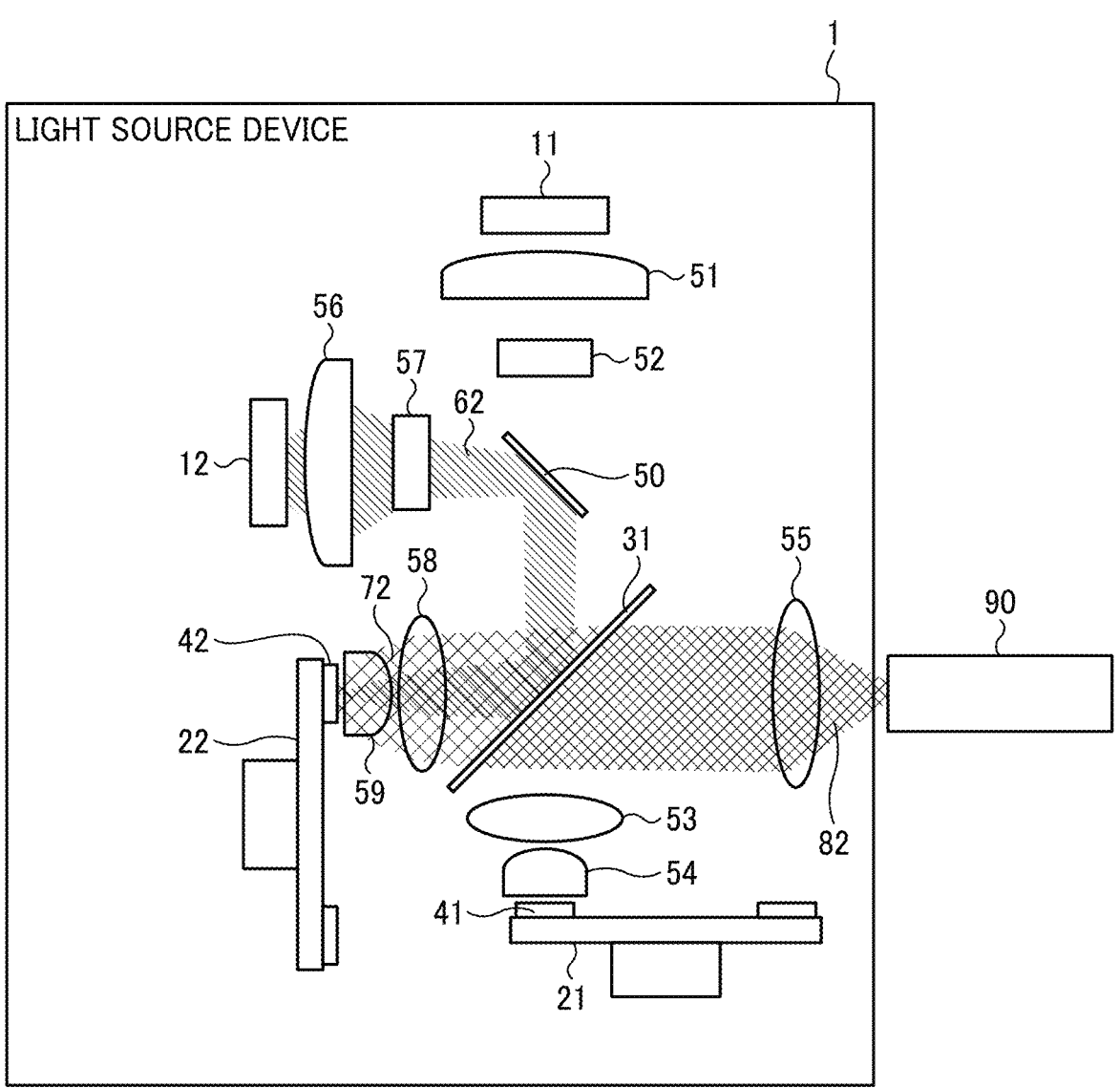
FIG. 11B is another illustration of the entire configuration of the light source device according to the fourth embodiment.
Figure 11C:
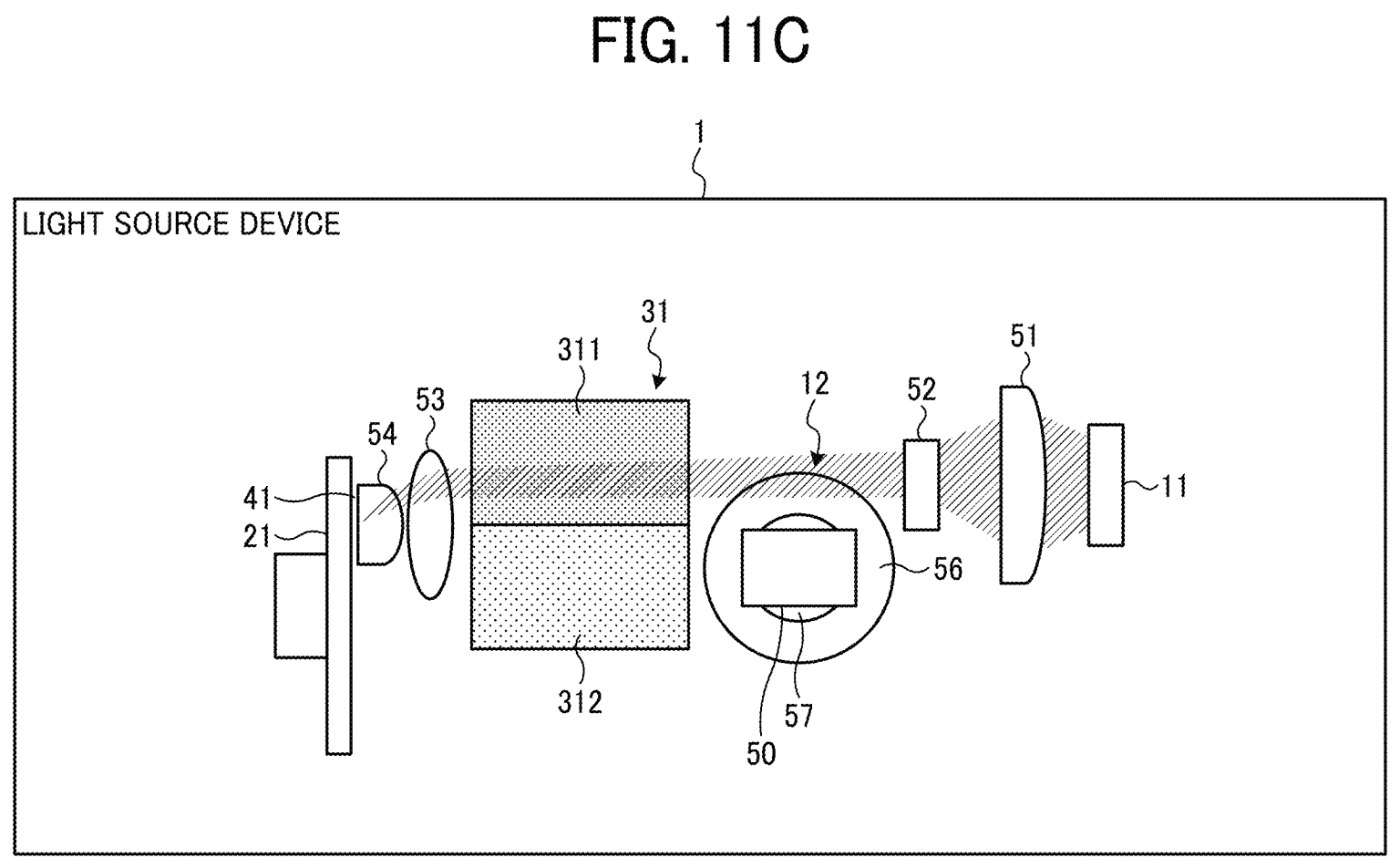

FIGS. 11A, 11B, and 11C are illustrations of the configuration of the light source device 1 according to the fourth embodiments of the present disclosure. FIG. 11C is a side view of the light source device 1 in FIG. 11A as viewed in a direction from the optical homogenizer 90 to the light source device 1.

In FIG. 11C, the optical homogenizer 90 and the lens 55 are not illustrated for ease of visibility.

In the light source device 1 of the present embodiment as illustrated in FIGS. 11A to 11C, the dichroic filter layer 311 and the dichroic filter layer 312 of the beam splitting and combining element 31 are arranged in the direction perpendicular to the drawing direction so that the optical axes of the first laser source 11 and the second laser source 12 are offset from each other in the direction perpendicular to the drawing direction.

As illustrated in FIG. 11C, the laser beam 61 emitted from the first laser light source 11 is transmitted through the upper dichroic filter layer 311 and passes through the upper portion of the lenses 53 and 54, proceeding forward while forming an angle relative to the optical axis of the lenses 53 and 54. Thus, the laser beam 61 strikes on the phosphor 41.

The laser beam 62 emitted from the second laser source 12 reflects off the lower dichroic filter layer 312 and passes through the lower portion of the lenses 58 and 59, proceeding forward while forming an angle relative to the optical axis of the lenses 58 and 59. Thus, the laser beam 62 strikes on the phosphor 42.

The light source device 1 with such a configuration produces resultant color light beams 81 and 82, which are the same as those in the first embodiment.

In the first embodiment, the optical axis of the second laser source 12 is offset from the optical axis of the first laser source 11 in the drawing direction. In this configuration, the size of the light source device 1 is increased in the drawing direction.

In the configuration of the present embodiment, the optical axis of the second laser source 12 is offset from the optical axis of the first laser source 11 in the direction perpendicular to the drawing direction. In this configuration, the size of the light source device 1 is reduced. The direction in which the optical axis is offset can be changed as desired according to the size of the light source device or the like.

FIFTH EMBODIMENT

A second embodiment will be described.

The fifth embodiment differs from the first embodiment in that the wavelength of light emitted from the first laser source 11 is different from the wavelength of light emitted from the second laser source 12. In the following description of the fifth embodiment, the description of the same configurations as in the first embodiment will be omitted, and those different from the first embodiment will be described.

Figure 12A:
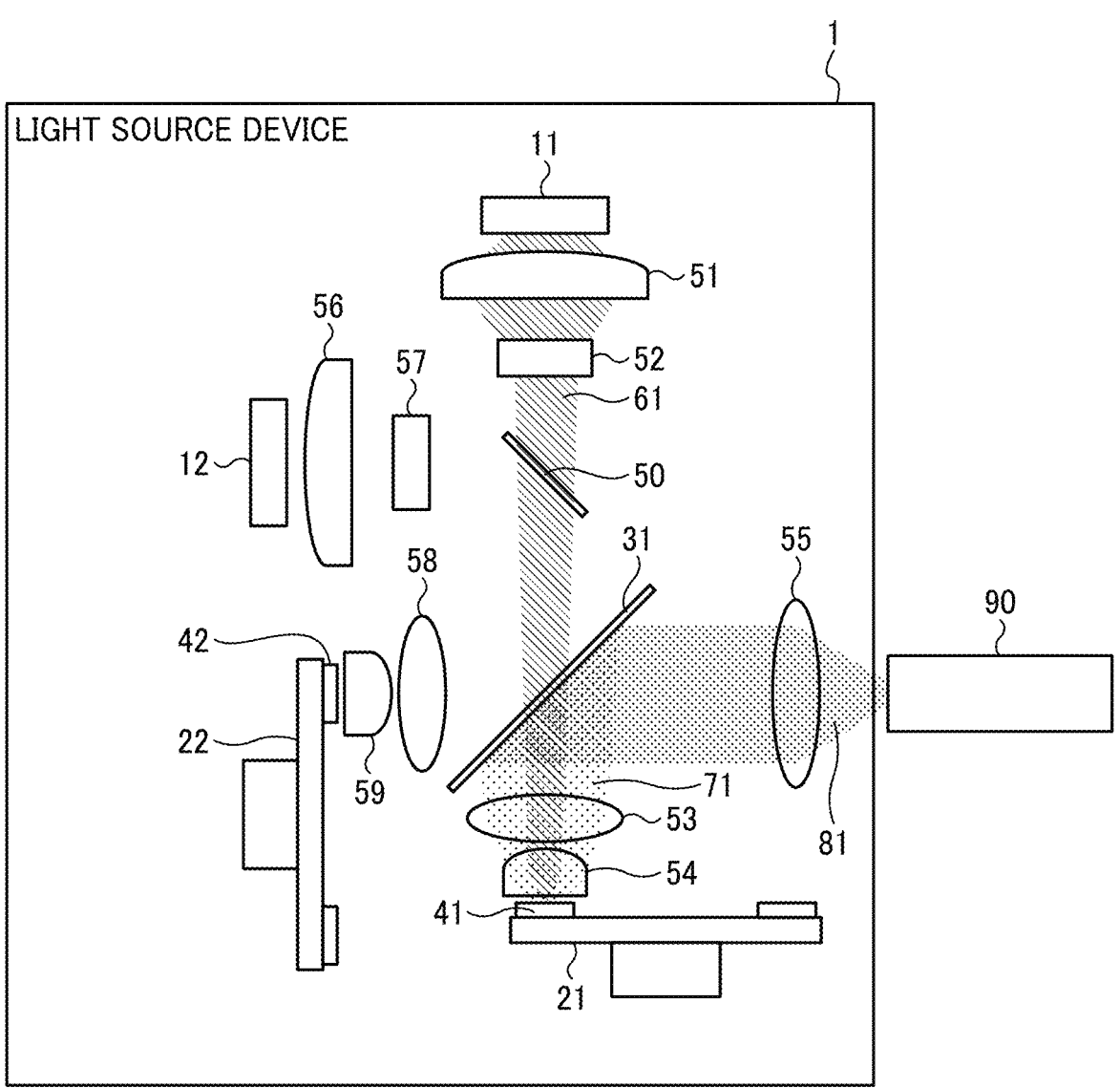
FIG. 12A is an illustration of the entire configuration of a light source device according to a fifth embodiment.
Figure 12B:
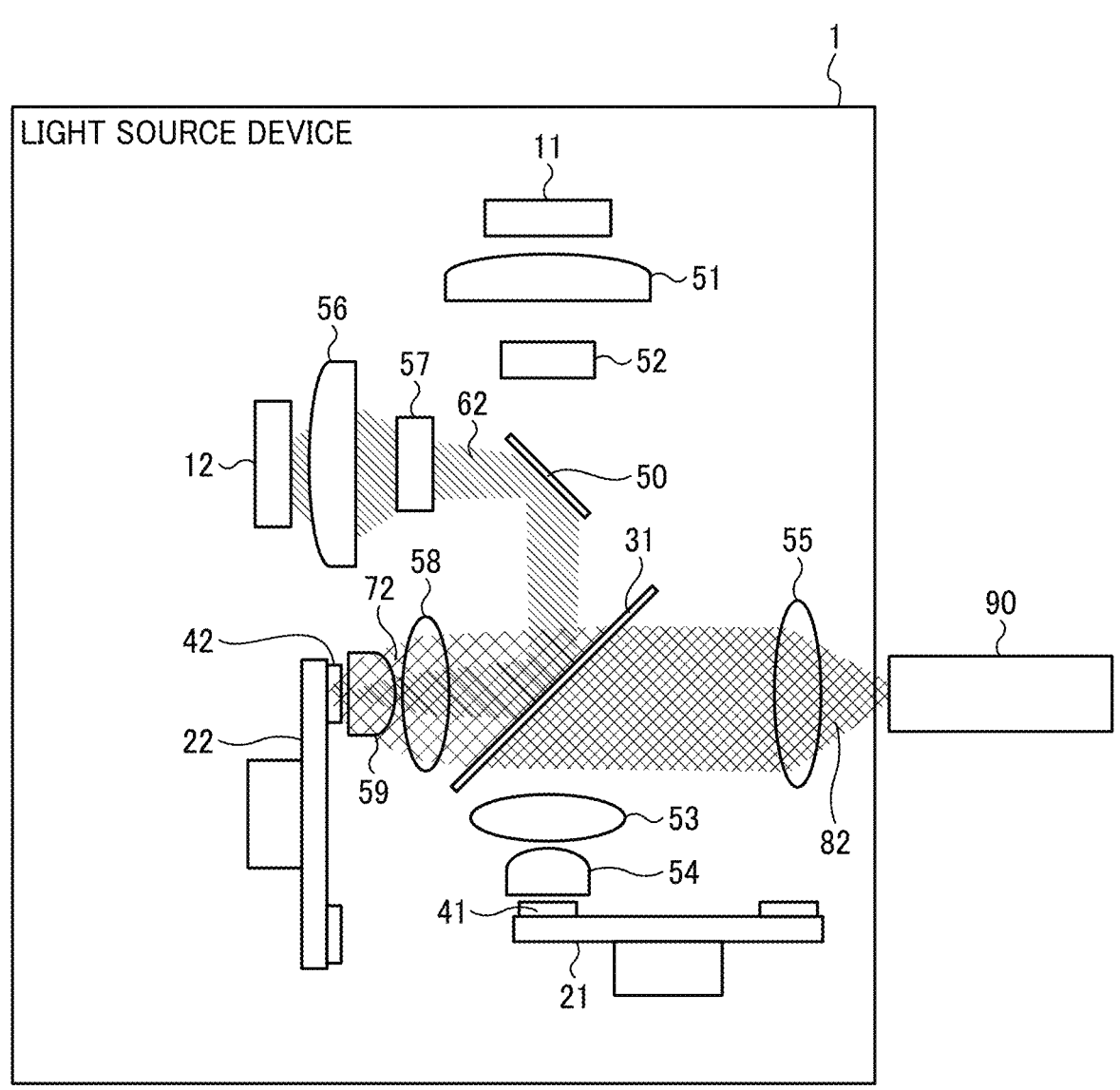
FIG. 12B is another illustration of the entire configuration of the light source device according to the fifth embodiment.
Figure 12C:
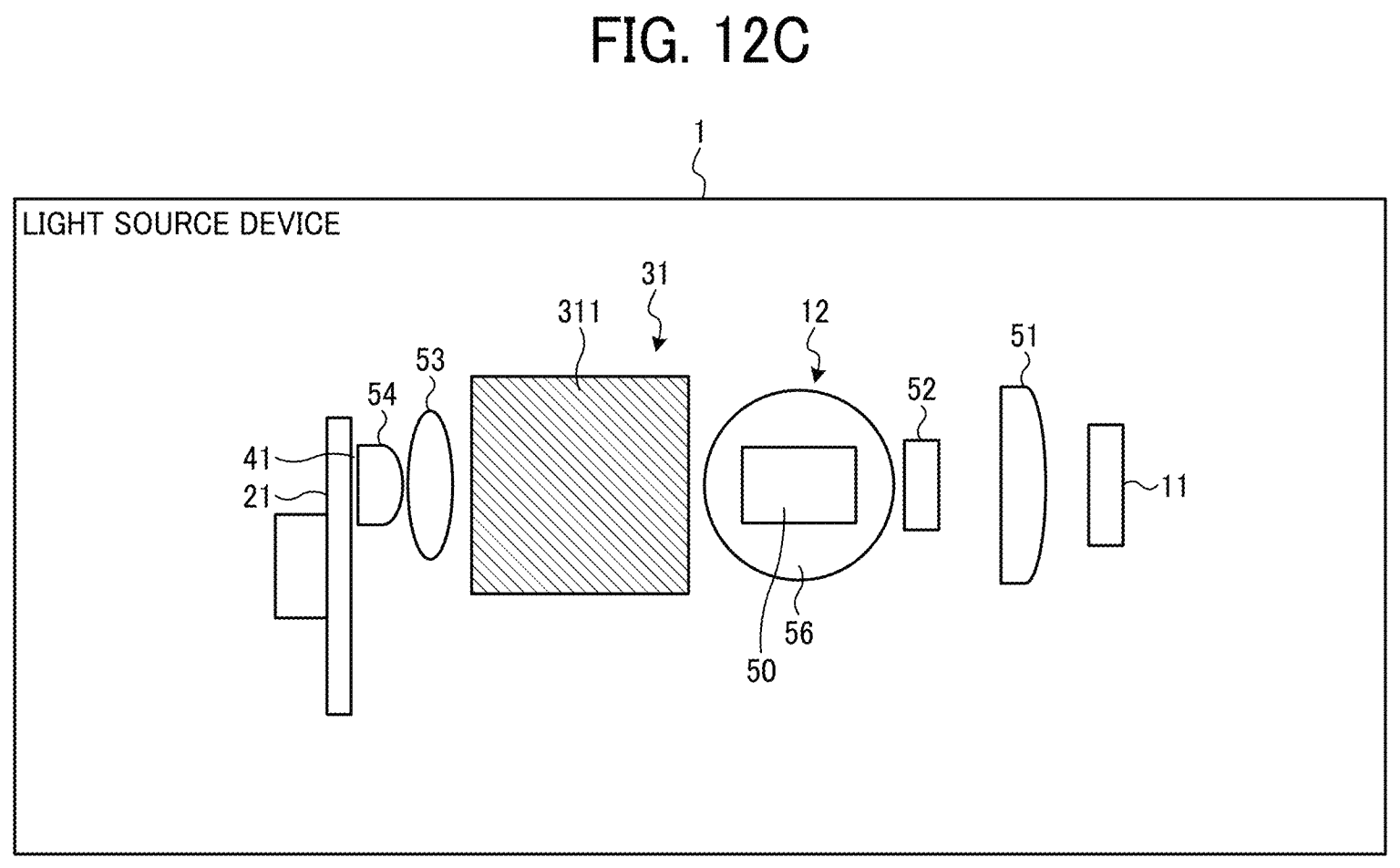
Figure 13:
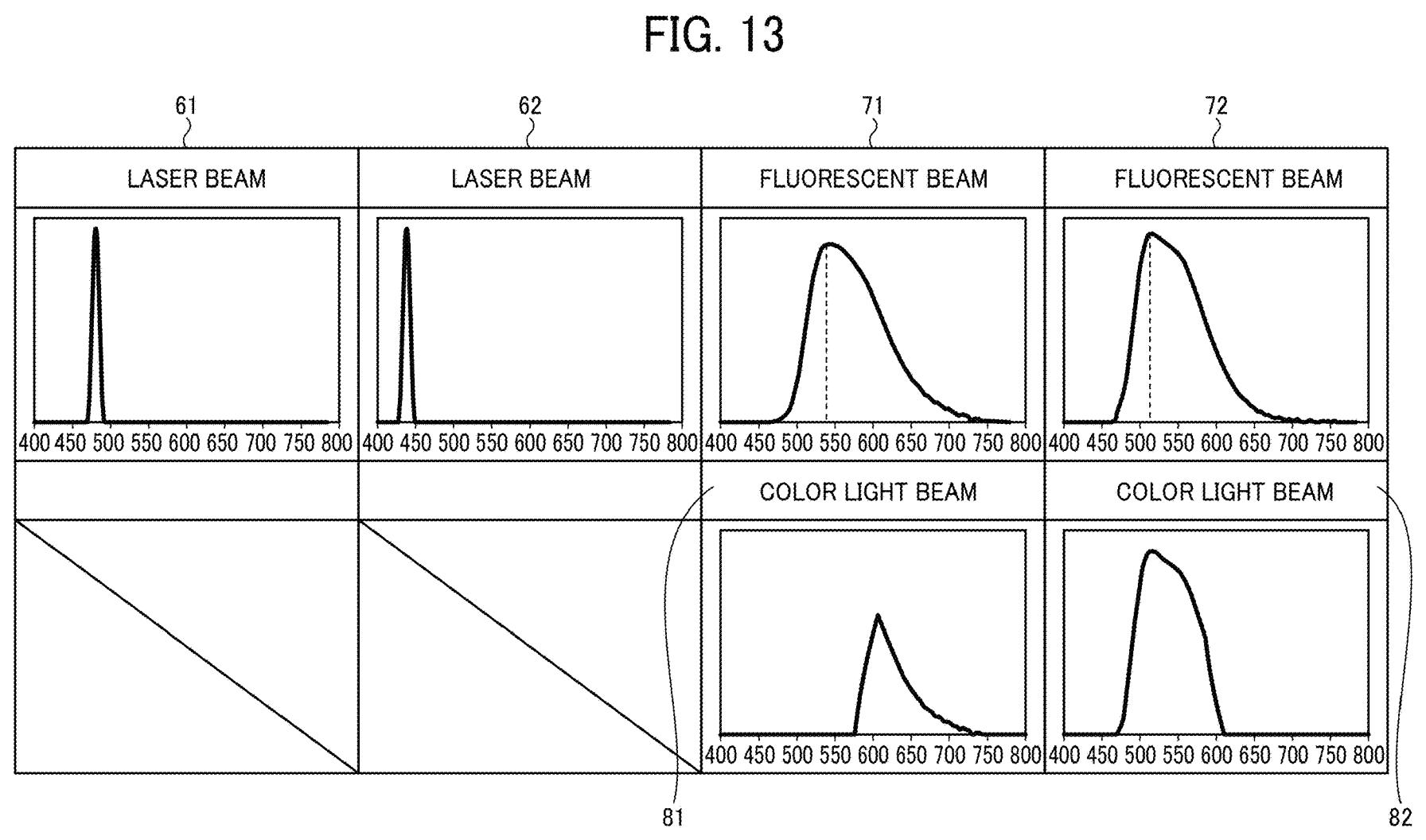

FIGS. 12A, 12B, and 12C are diagrams of the entire configuration of a light source device S according to the fifth embodiment. FIG. 13 is a collection of graphs of the optical spectra of the respective light beams according to an embodiment of the present disclosure.

FIG. 12C is a side view of the light source device 1 in FIG. 12A as viewed in a direction from the optical homogenizer 90 to the light source device 1. In FIG. 12C, the optical homogenizer 90 and the lens 55 are not illustrated for ease of visibility. In the present embodiment, the wavelength of light emitted from the first laser source 11 is different from the wavelength of light emitted from the second laser source 12.

Figure 14A:
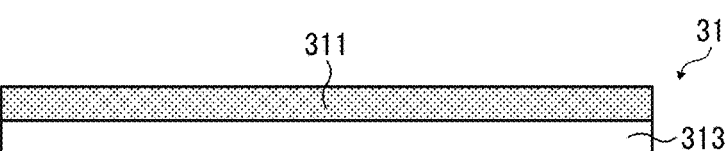
FIGS. 14A and 14B are illustrations of a configuration of a beam splitting and combining element.
Figure 14B:
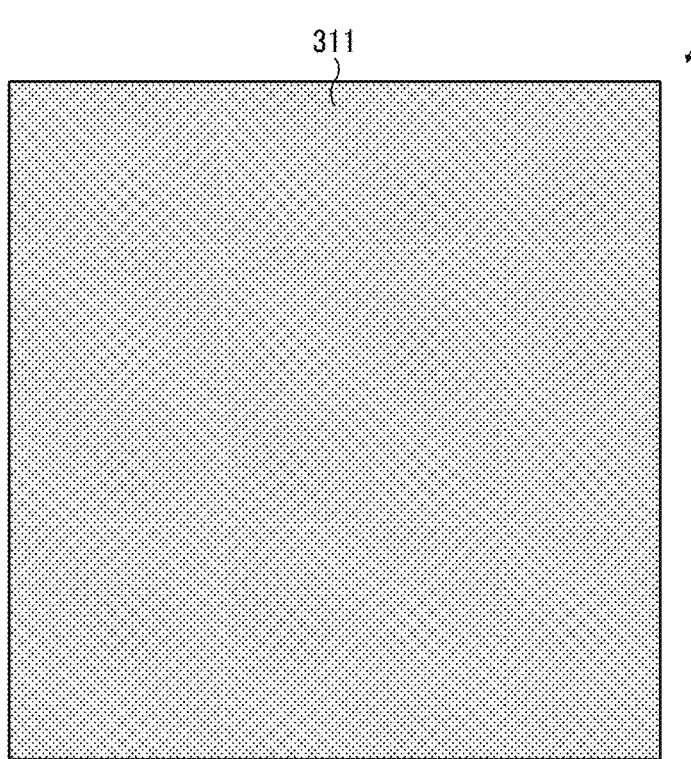

FIGS. 14A and 14B are illustrations of the configuration of a beam splitting and combining element 31. FIG. 14A is a side view of the configuration of the beam splitting and combining element 31. FIG. 14B is a plan view of the configuration of the beam splitting and combining element 31.

As illustrated in FIGS. 14A and 14B, the beam splitting and combining element 31 of the present embodiment differs from that of the first embodiment in that only a dichroic filter layer 311 having the properties of transmitting or reflecting a desired wavelength of light is on a glass plate 313 capable of transmitting, for example, visible light.

Figure 15:
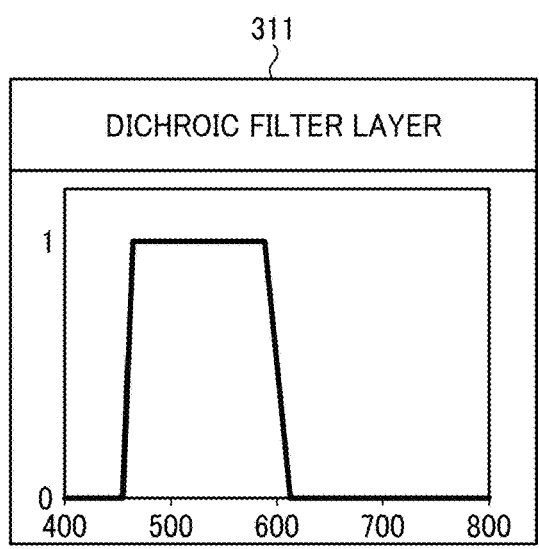
FIG. 15 indicates graphs of the transmittance spectra of a dichroic filter layer and a dichroic filter layer, respectively of the beam splitting and combining element, according to an embodiment of the present disclosure.

FIG. 15 indicates graphs of the transmittance spectrum of the dichroic filter layer 311 of the beam splitting and combining element 31, according to an embodiment of the present disclosure.

In FIG. 15, light in a wavelength range for which the value of the vertical axis is 1 is transmitted through the dichroic filter layer, whereas light in a wavelength range for which the value of the vertical axis is 0) reflects off the dichroic filter layer.

In the present embodiment, the dichroic filter layer 311 of the beam splitting and combining element 31 transmits light in a blue to green wavelength range from approximately 450 to 600 nm and reflects light in a wavelength range out of the blue to green wavelength range as indicated by the transmittance spectrum in FIG. 15.

In other words, the laser beam 61 emitted from the first laser source 11 is transmitted through the beam splitting and combining element 31 and proceeds to strike on the phosphor 41, whereas the laser beam 62 emitted from the second laser source 12 reflects off the beam splitting and combining element 31 and proceeds to strike on the phosphor 42. The optical path subsequent to each of the phosphor wheels 21 and 22 is the same as that of the first embodiment.

The present embodiment eliminates the use of two dichroic filter layers on the beam splitting and combining element 31 and thus enables lower cost.

In addition, with no interval between the two dichroic filter layers, a decrease in light use efficiency of fluorescence can be reduced. Such a configuration further eliminates the need for positional adjustment of the glass plate on which two dichroic filter layers are disposed and allows a simple manufacture of the light source device.

SIXTH EMBODIMENT

A second embodiment will be described.

The sixth embodiment differs from the first embodiment to the fifth embodiment in that the polarization of light is manipulated to perform splitting and combining of light.

Note that like reference signs are given to elements similar to those described in the first embodiment to the fifth embodiment, and their detailed description is omitted in the following description of the sixth embodiment of the present disclosure.

Figure 16A:
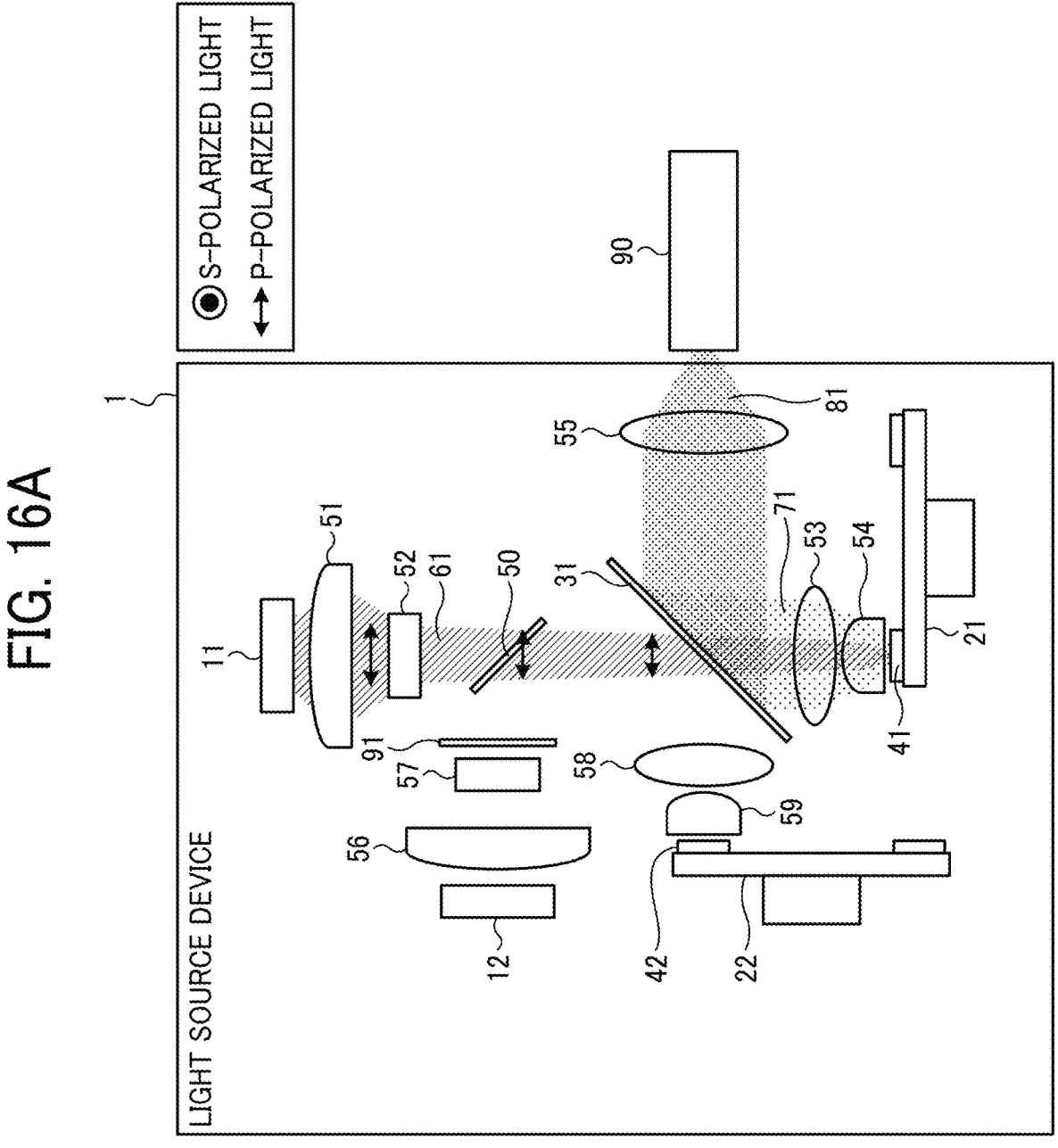
FIG. 16A is an illustration of the entire configuration of a light source device according to a sixth embodiment.
Figure 16B:
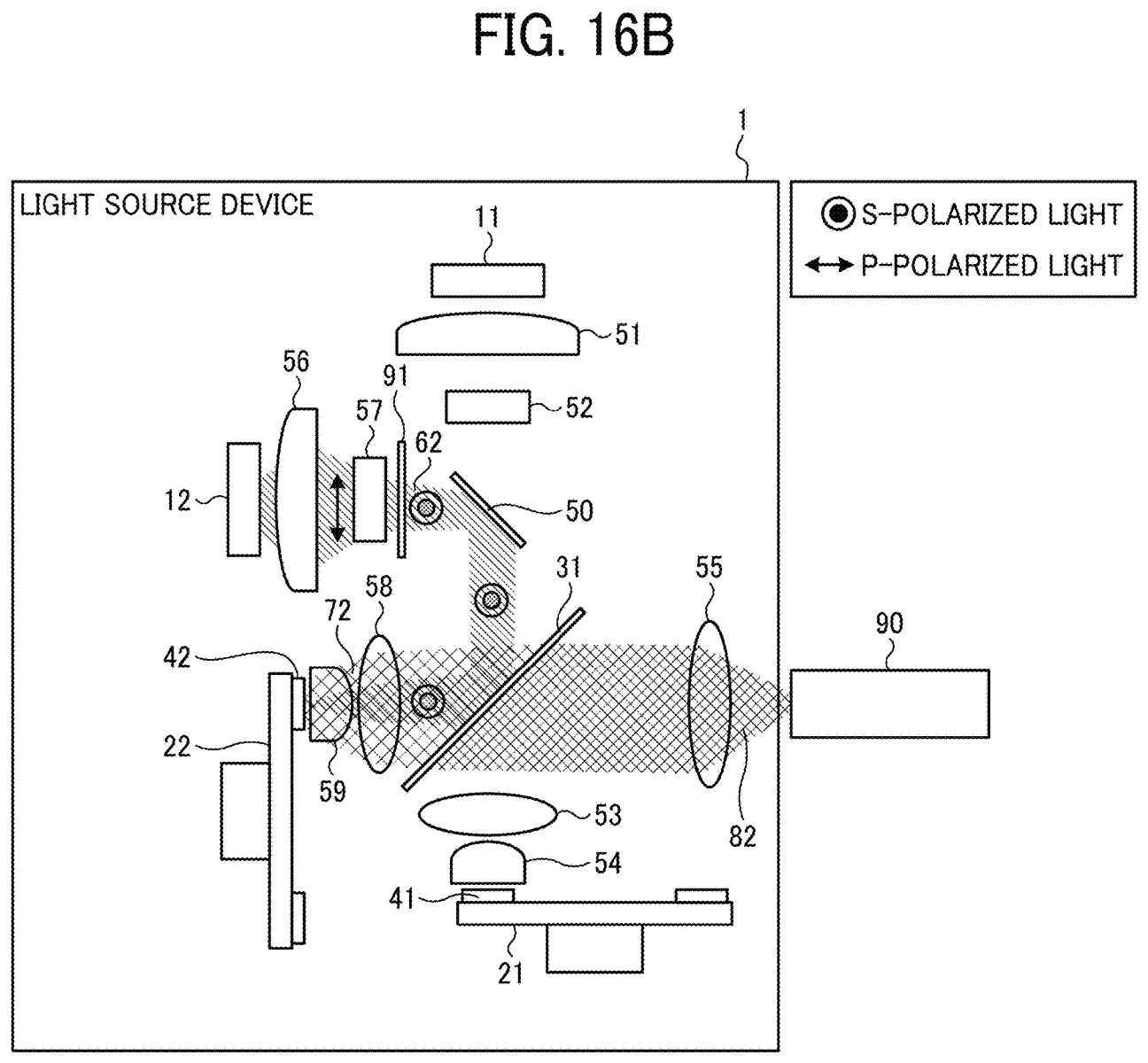
Figure 16C:
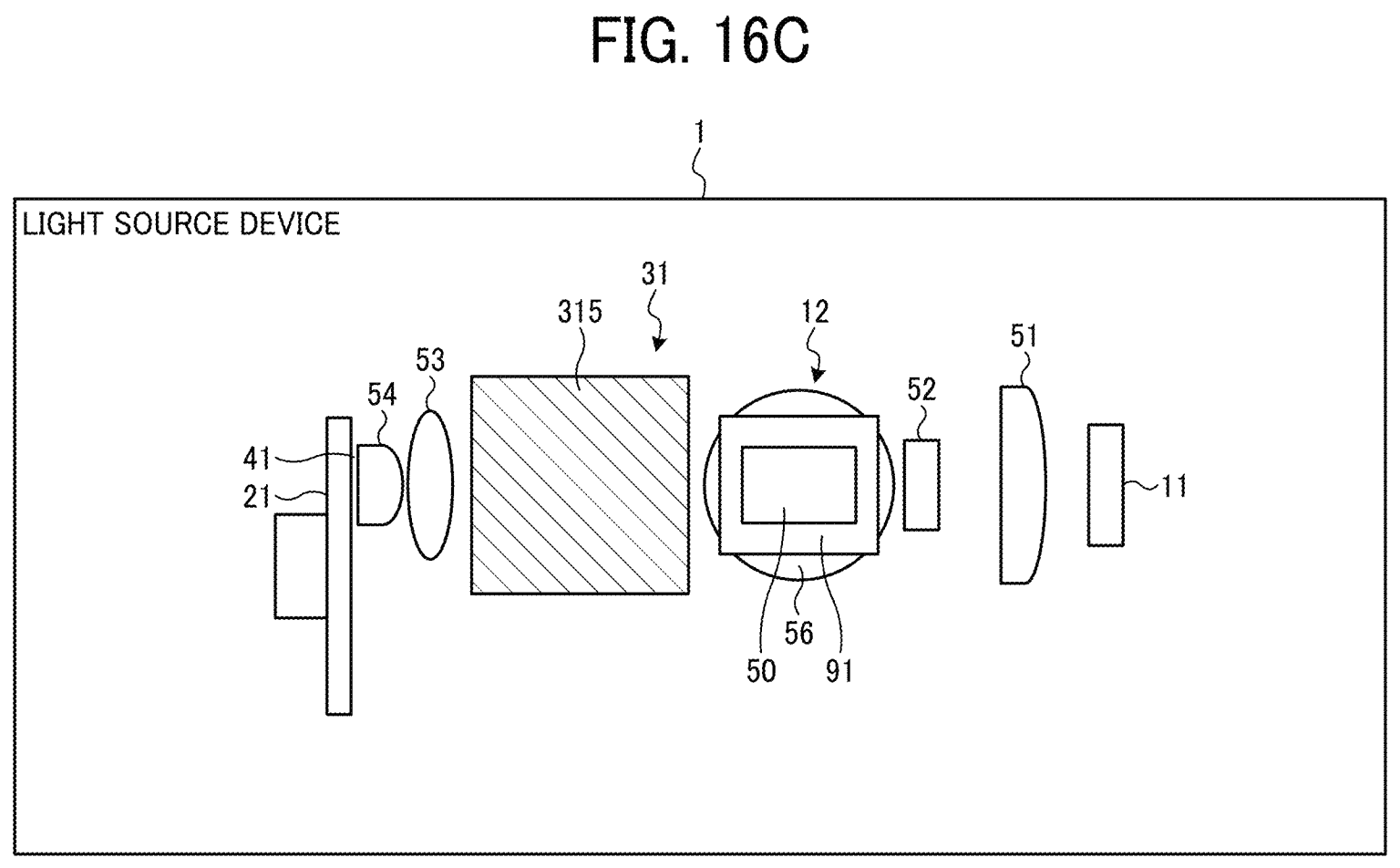
Figure 17:
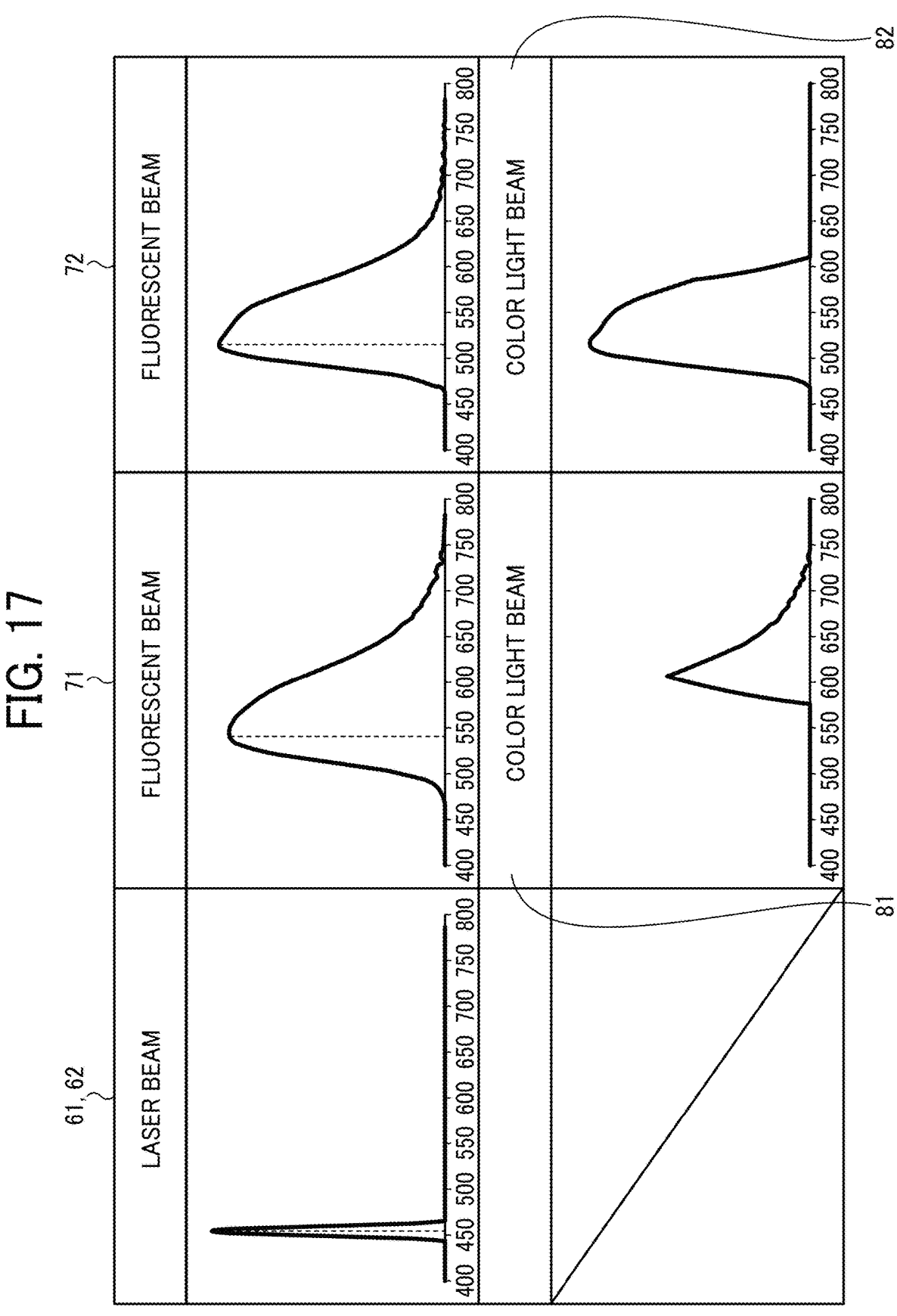
FIG. 17 is a collection of diagrams of optical spectra of light beams according to an embodiment of the present disclosure.

FIGS. 16A, 16B, and 16C are diagrams of the entire configuration of a light source device 6 according to the sixth embodiment. FIG. 17 is a collection of graphs of the optical spectra of the respective light beams according to an embodiment of the present disclosure.

FIG. 16C is a side view of the light source device 1 in FIG. 16A as viewed in a direction from the optical homogenizer 90 to the light source device 1. In FIG. 16C, the optical homogenizer 90 and the lens 55 are not illustrated for ease of visibility.

In the light source device 1 of the present embodiment, the first laser source 11 and the second laser source 12 both emit light with the same wavelength of approximately 455 nm. The light source device 1 includes a polarization converter 91 only in the optical path of the laser beam 62 emitted from the second laser source 12. The polarization converter 91 uses, for example, a ½ λ plate, and serves to rotate polarization of light by 90 degrees.

In the present embodiment, the polarization converter 91 is used to change the polarization directions of the light beams emitted from the two laser sources 11 and 12. However, no limitation is indicated thereby. Alternatively, the polarization directions of the light beams emitted from the two laser sources 11 and 12 may be changed without using the polarization converter 91.

More specifically, since each laser light source emits a laser beam that is polarized in the same polarized direction, desired polarization is obtained by rotating the laser light source about the optical axis.

For example, when the laser beam emitted from the first laser source 11 is P-polarized light, the second laser source 12 is rotated by 90 degrees to make the laser beam emitted from the second laser source 12 S-polarized.

The first laser source 11 emits a P-polarized laser beam 61 to the beam splitting and combining element 31. The second laser source 12 emits a P-polarized laser beam 62 to the polarization converter 91. The polarization converter 91 converts the P-polarized laser beam 62 into an S-polarized laser beam and outputs the S-polarized laser beam to the beam splitting and combining element 31.

As illustrated in FIG. 16C, the beam splitting and combining element 31 includes a polarization splitting filter layer 315 (a polarization splitter) on a glass plate 313.

Figure 18:
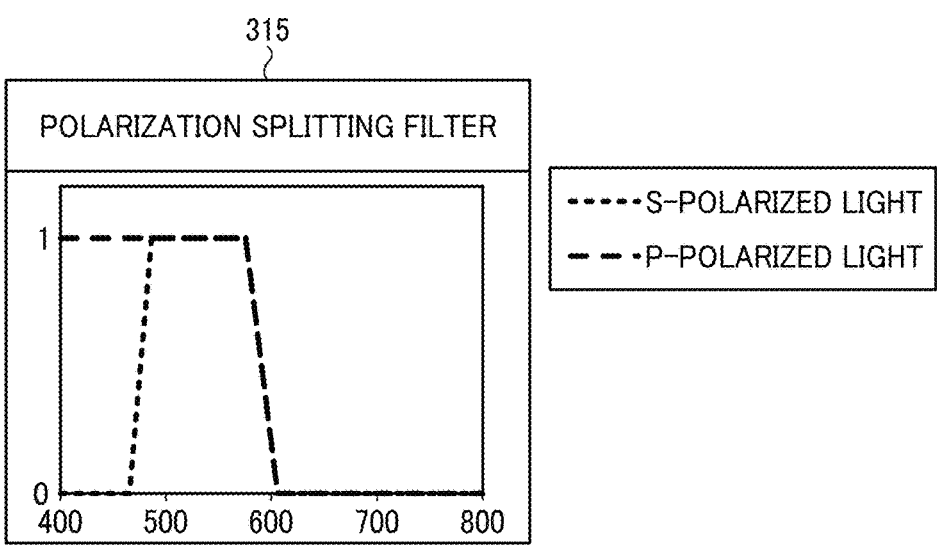
FIG. 18 is a graph of the transmittance spectrum of a polarization splitting filter layer of the beam splitting and combining element, according to an embodiment of the present disclosure.

FIG. 18 is a graph of the transmittance spectrum of a polarization splitting filter layer 315 of the beam splitting and combining element 31, according to an embodiment of the present disclosure. In FIG. 18, light in a wavelength range for which the value of the vertical axis is 1 is transmitted through the dichroic filter layer, whereas light in a wavelength range for which the value of the vertical axis is 0 reflects off the dichroic filter layer.

In the present embodiment, the polarization splitting filter layer 315 of the beam splitting and combining element 31 has different transmittance spectra for the S-polarized light and the P-polarized light, respectively as indicated by FIG. 18. For the S-polarized light, the polarization splitting filter layer 315 transmits green light in a wavelength range from approximately 475 to 600 nm and reflects light of the other colors. For the P-polarized light, the polarization splitting filter layer 315 reflects red light in a wavelength range of approximately 600 nm or greater and transmits light of the other colors.

In other words, the S-polarized laser beam 62 reflects off the beam splitting and combining element 31 and proceeds to strike on the phosphor 42, whereas the P-polarized laser beam 61 is transmitted through the beam splitting and combining element 31 and proceeds to strike on the phosphor 41. The optical path subsequent to each of the phosphor wheels 21 and 22 is the same as that of the first embodiment.

The present embodiment eliminates the use of two dichroic filter layers on the beam splitting and combining element 31 and thus enables lower cost.

In addition, with no interval between the two dichroic filter layers, a decrease in light use efficiency of fluorescence can be reduced.

Such a configuration further eliminates the need for positional adjustment of the glass plate on which two dichroic filter layers are disposed and allows a simple manufacture of the light source device.

SEVENTH EMBODIMENT

A seventh embodiment will be described.

The seventh embodiment differs from the first embodiment in that all of the laser beam is not converted into fluorescence (fluorescent rays) by the phosphor but a part (some rays) of the laser beam is emitted from the phosphor. In the following description of the seventh embodiment, the description of the same configurations as in the first embodiment will be omitted, and those different from the first embodiment will be described.

Figure 19A:
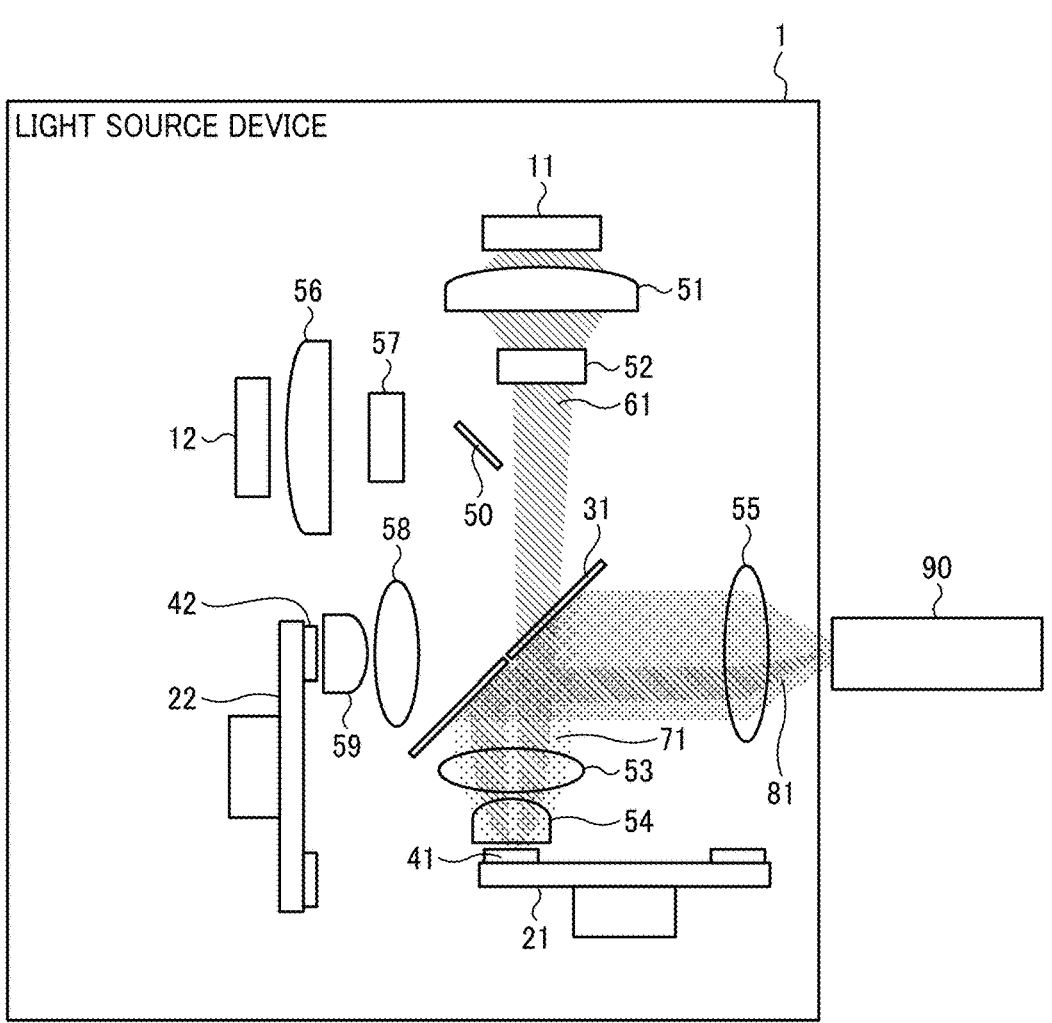
FIG. 19A is an illustration of the entire configuration of a light source device according to a seventh embodiment.
Figure 19B:
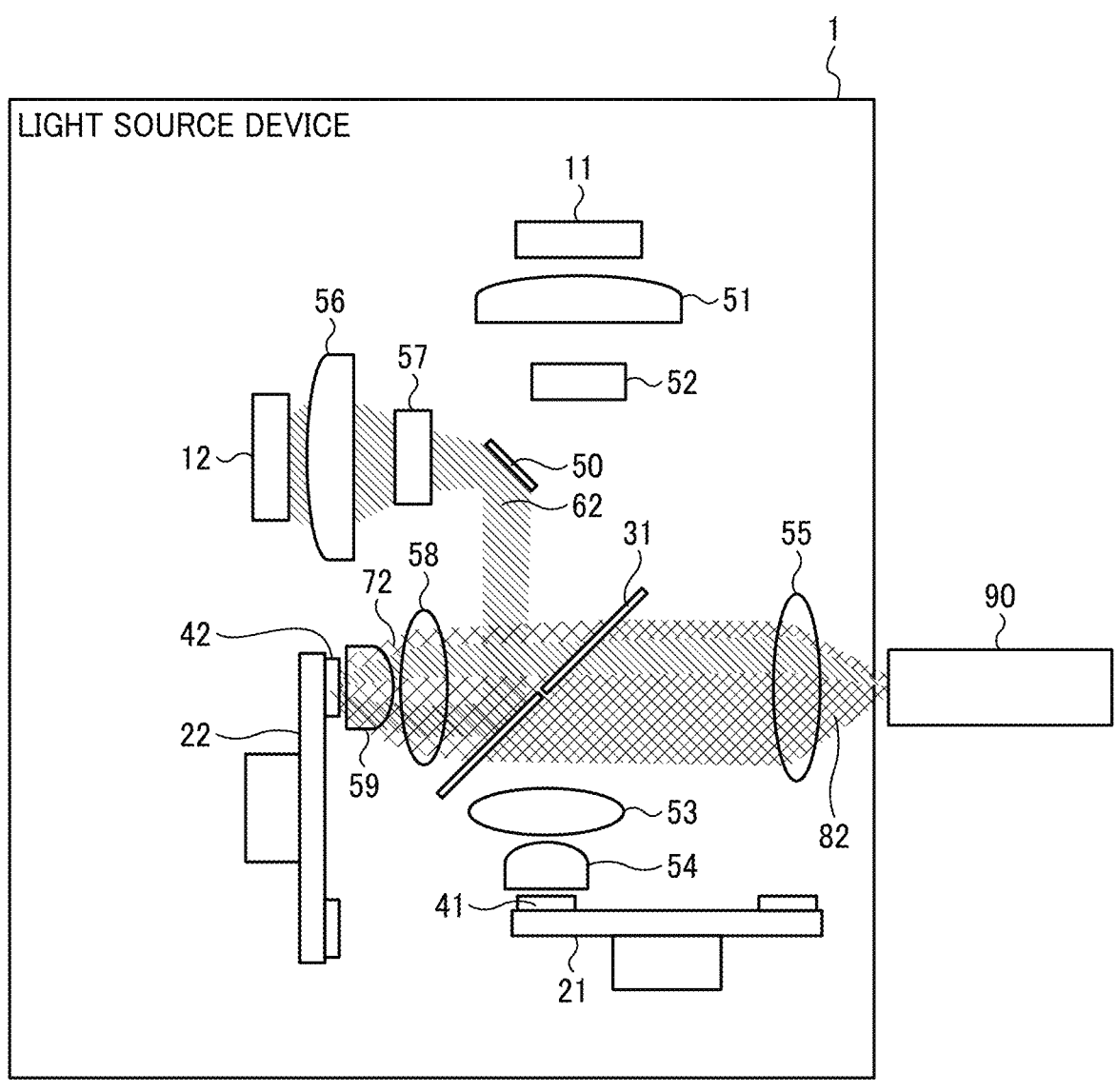
FIG. 19B is another diagram of the configuration of the light source device according to the seventh embodiment.

FIGS. 19A and 19B are illustrations of the entire configuration of a light source device 1 according to the seventh embodiment. As illustrated in FIGS. 19A and 19B, some rays of the laser beam 61 are not converted by the phosphor 41 of the phosphor wheel 21 and proceeds through the lenses 53 and 54 in a direction away from the optical axis of the lenses 53 and 54 while forming an angle relative to the optical axis of the lenses 53 and 54. Then, said some rays reflects off the dichroic filter layer 312 of the beam splitting and combining element 31 to the optical homogenizer 90.

Some rays of the laser beam 62 are not converted by the phosphor 42 of the phosphor wheel 22 and proceeds through the lenses 58 and 59 in a direction away from the optical axis of the lenses 58 and 59 while forming an angle relative to the optical axis of the lenses 58 and 59. Then, said some rays are transmitted through the dichroic filter layer 311 of the beam splitting and combining element 31 to the optical homogenizer 90.

Thus, some rays of the laser beam remains blue without having their wavelength converted and enters the optical homogenizer 90 as blue light. The optical homogenizer 90 mixes the blue light with the color light beam 81 and the color light beam 82 to produce white light. In other words, the light source device 1 of the present embodiment allows white light to be produced. This configuration is applicable in any of the first embodiment to the fourth embodiment.

EIGHTH EMBODIMENT

An eighth embodiment will be described.

The eighth embodiment differs from the first embodiment in that the color light beam 81 and the color light beam 82 emitted from the beam splitting and combining element 31 are combined with blue light. In the following description of the eighth embodiment, the description of the same configurations as in the first embodiment will be omitted, and those different from the first embodiment will be described.

Figure 20A:
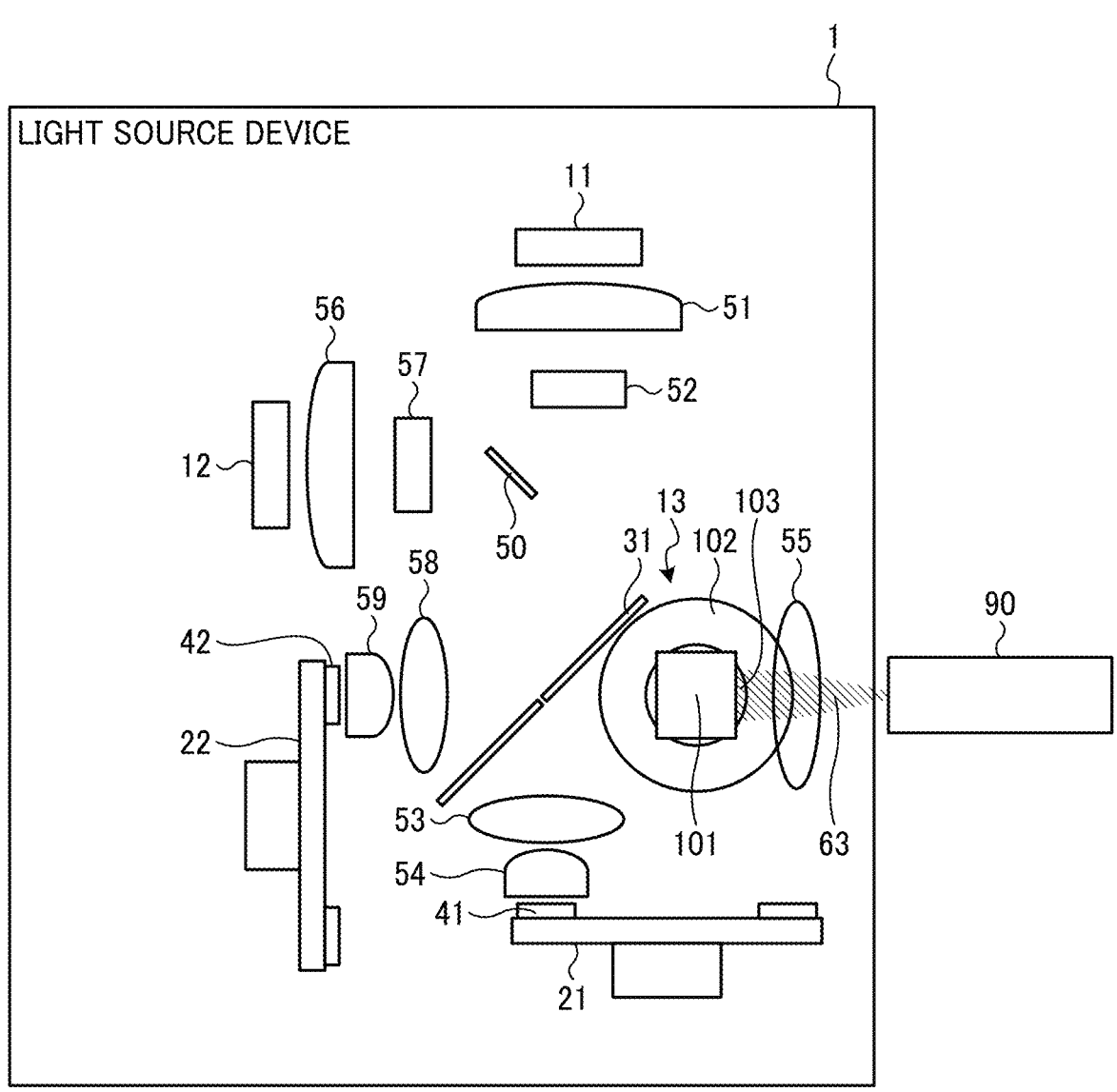
FIG. 20A is an illustration of the entire configuration of a light source device according to an eighth embodiment.
Figure 20B:
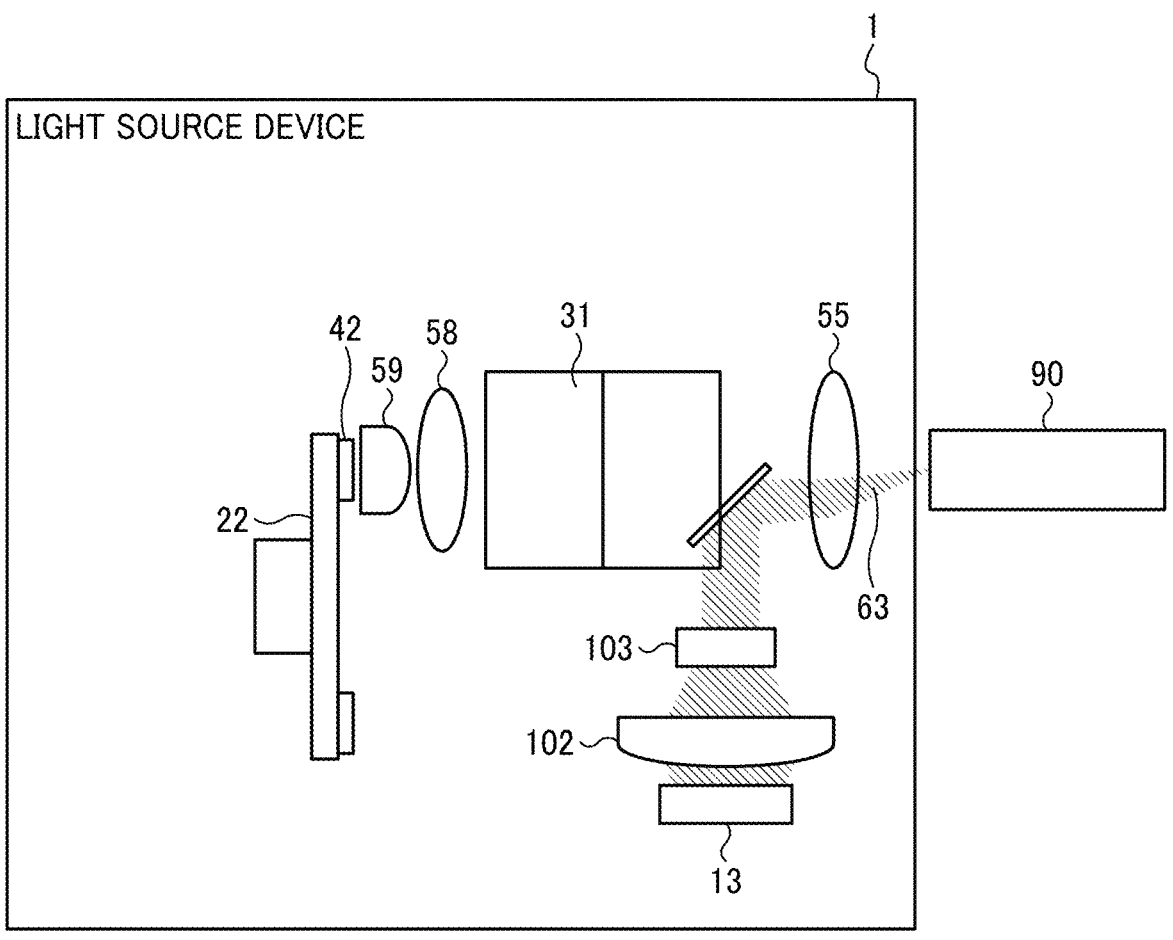
FIG. 20B is another illustration of the entire configuration of the light source device according to the eighth embodiment.

FIGS. 20A and 20B are illustrations of the entire configuration of a light source device 1 according to the eighth embodiment. FIG. 20B is a side view of the light source device 1 in FIG. 20A as viewed in a direction from the phosphor wheel 21 to the light source device 1.

The light source device 1 according to the present embodiment includes a third laser light source 13 (a third light source) at a lower portion of the light source device 1 in the vertical direction in FIG. 20B (i.e., in the back of the light source device 1 in the depth direction, or the drawing direction in FIG. 20A). The third laser light source 13 emits a laser beam 63 (a third excited beam).

Further, the light source device 1 according to the present embodiment includes a mirror 101 and lenses 102 and 103. The mirror 101 transmits the color light beams 81 and 82 and reflects the laser beam 63. Thus, the laser beam 63 is combined with the color light beams 81 and 82, proceeding to the optical homogenizer 90.

As described above, the light source device 1 of the present embodiment produces white light by combining the laser beam 63 with the color light beams 81 and 82. This configuration is applicable in any of the first embodiment to the seventh embodiment.

NINTH EMBODIMENT

A ninth embodiment will be described.

The ninth embodiment differs from the first embodiment in that a green phosphor is used for phosphor wheel 21 and a yellow phosphor is used for phosphor wheel 22.

In the following description of the ninth embodiment, the description of the same configurations as in the first embodiment will be omitted, and those different from the first embodiment will be described.

The following describes an issue of the light source device 1 according to the first embodiment.

Figure 21A:
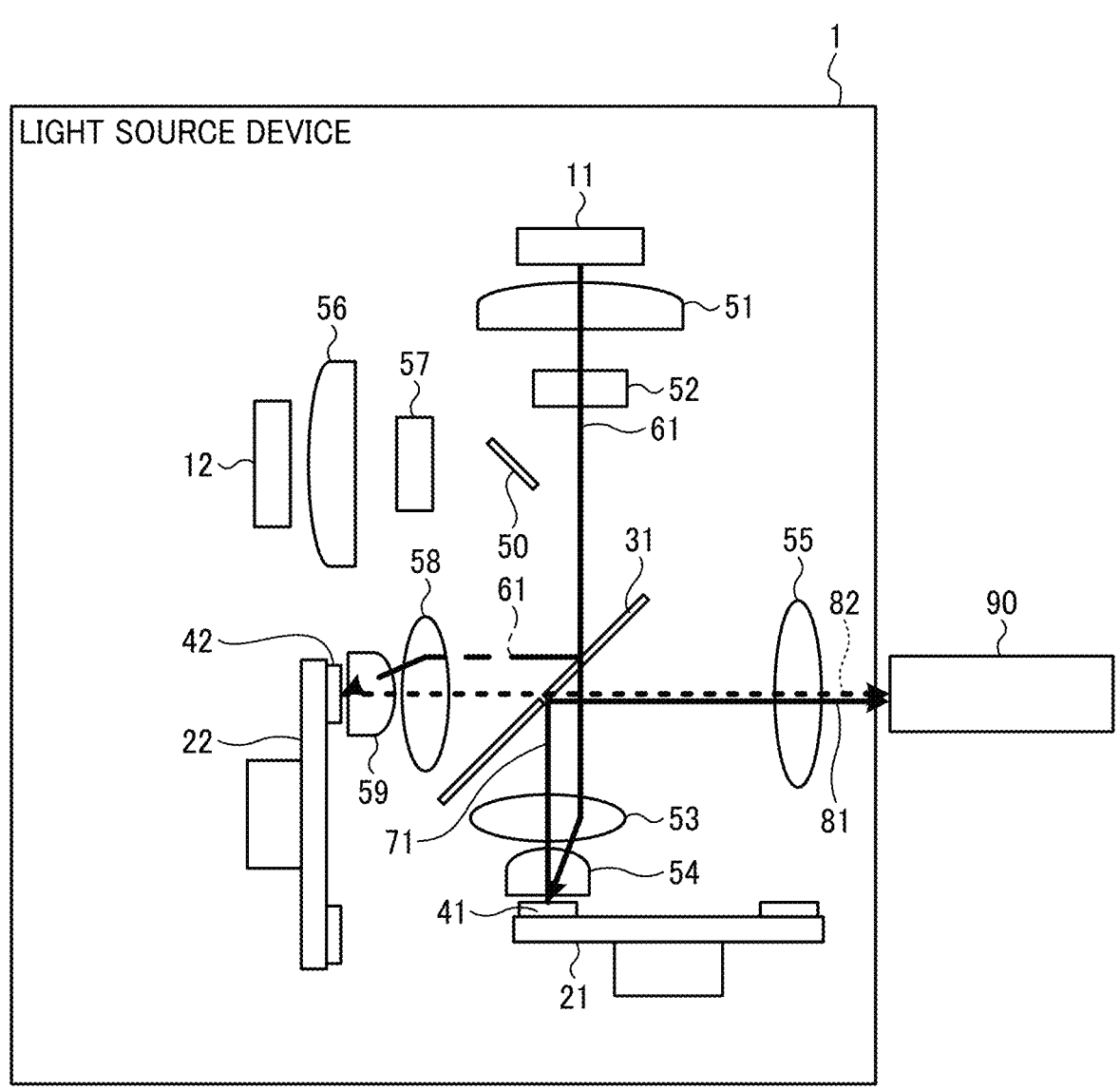
FIG. 21A is an illustration for explaining an issue of the light source device according to an embodiment of the present disclosure.
Figure 21B:
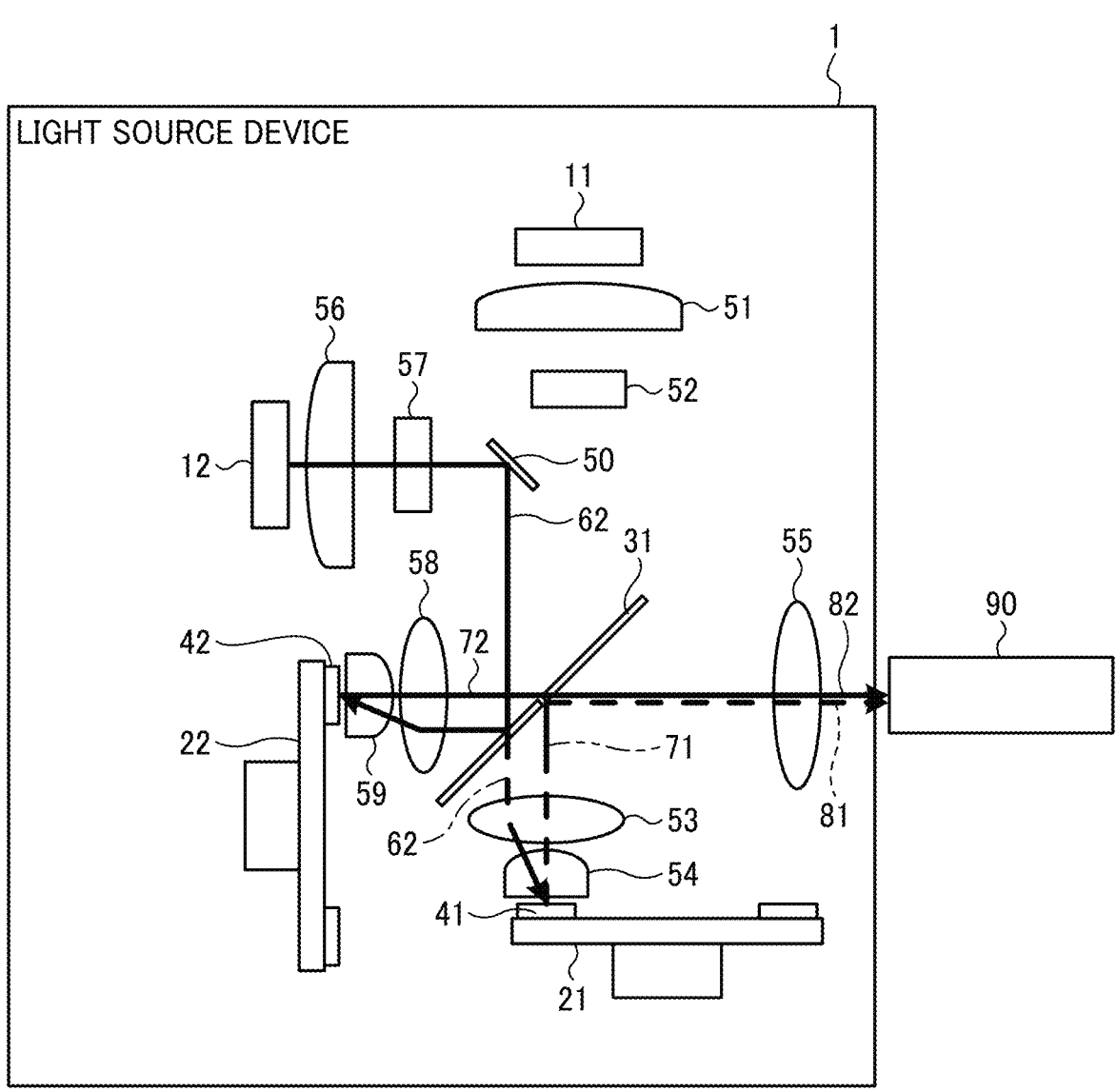
FIG. 21B is another illustration for explaining an issue of the light source device according to an embodiment of the present disclosure.

FIGS. 21A and 21B are illustration for explaining the issue of the light source device 1. As illustrated in FIG. 21A, ideally, only the phosphor 41 on the phosphor wheel 21 is excited to allow only the color light beam 81 to proceed to the optical homogenizer 90 during the time in which the first laser source 11 is turned on.

As illustrated in FIG. 21B, ideally, only the phosphor 41 on the phosphor wheel 22 is excited to allow only the color light beam 82 to proceed to the optical homogenizer 90 during the time in which the first laser source 12 is turned on.

However, in practice, the reflectance and transmittance of the two dichroic filter lavers 311 and 312 of the beam splitting and combining element 31 cannot be completely set to 100% or 0% and is typically set to about 95 to 99%.

For example, in FIG. 21A, it is assumed that the transmittance of the dichroic filter layer 311 of the beam splitting and combining element 31 is 97% (i.e., the reflectance is 3%). In this case, when the first laser source 11 is turned on, 97% of the laser beam 61 emitted from the first laser source 11 proceeds toward the phosphor wheel 21, whereas 3% of the laser beam 61 proceeds toward the phosphor wheel 22.

This causes the color light beam 81 (red light) to be slightly mixed with the color light beam 82 (green light), and reduces the color purity of the red light.

Similarly, in FIG. 21B, it is assumed that the reflectance of the dichroic filter layer 312 of the beam splitting and combining element 31 is 97% (i.e., the transmittance is 3%) In this case, when the second laser source 12 is turned on, 97% of the laser beam 62 emitted from the second laser source 12 proceeds toward the phosphor wheel 22, whereas 3% of the laser beam 62 proceeds toward the phosphor wheel 21.

This causes the color light beam 82 (green light) to be mixed with the color light beam 81 (red light), and reduces the color purity of the green light.

Further, the light source device 1 has issues specific to a laser light source because light sources used in the optical system of the light source device 1 according to the first embodiment are the laser sources 11 and 12.

The transmittance and the reflectance of the two dichroic filter layers 311 and 312 and of the beam splitting and combining element 31 are expressed as, for example, 97% by using the transmittance of randomly polarized light. However, in practice, the transmittance and the reflectance differ depending on the polarization direction of the laser beams incident on the dichroic filter layer 311 and the dichroic filter layer 312 of the beam splitting and combining element 31. This will be described in detail below.

FIGS. 22A and 22B are illustrations for indicating the definition of the polarization direction of laser beams. As illustrated in FIG. 22A, a laser beam that is polarized in a direction perpendicular to a plane horizontal to each of the laser beam striking on the dichroic mirror and the laser beam reflecting off the dichroic mirror is S-polarized light (i.e., the polarization direction with respect to the dichroic mirror is the direction perpendicular to the plane horizontal to each of the laser beams striking on and reflecting off the dichroic mirror). As illustrated in FIG. 22B, a laser beam that is polarized in a direction parallel to the plane horizontal to each of the laser beams striking on and reflecting off the dichroic mirror is P-polarized light (i.e., the polarization direction with respect to the dichroic mirror is the direction parallel to each of the laser beams striking on and reflecting off the dichroic mirror). For typical differences in transmittance and reflectance between the polarization directions with respect to the dichroic mirror, S-polarized light has a higher reflectance, whereas P-polarized light has a higher transmittance. To effectively achieve the intended performance, S-polarized light is used as light to reflect off the dichroic mirror, and P-polarized light is used as light to strike on the dichroic mirror. The laser light source, which emits a linearly polarized laser beam, is to be designed in consideration of such characteristics of polarized light.

In the light source device 1 according to the first embodiment, the polarization direction of the first excitation light emitted from the first laser source 11 to the dichroic filter layer 311 is substantially parallel to the plane of incidence thereon (i.e., the first excitation light is substantially P-polarized light), and the polarization direction of the second excitation light emitted from the second laser source 12 to the dichroic filter layer 312 is substantially perpendicular to the plane of incidence thereon (i.e., the second excitation light is substantially S-polarized light).

Figure 23A:
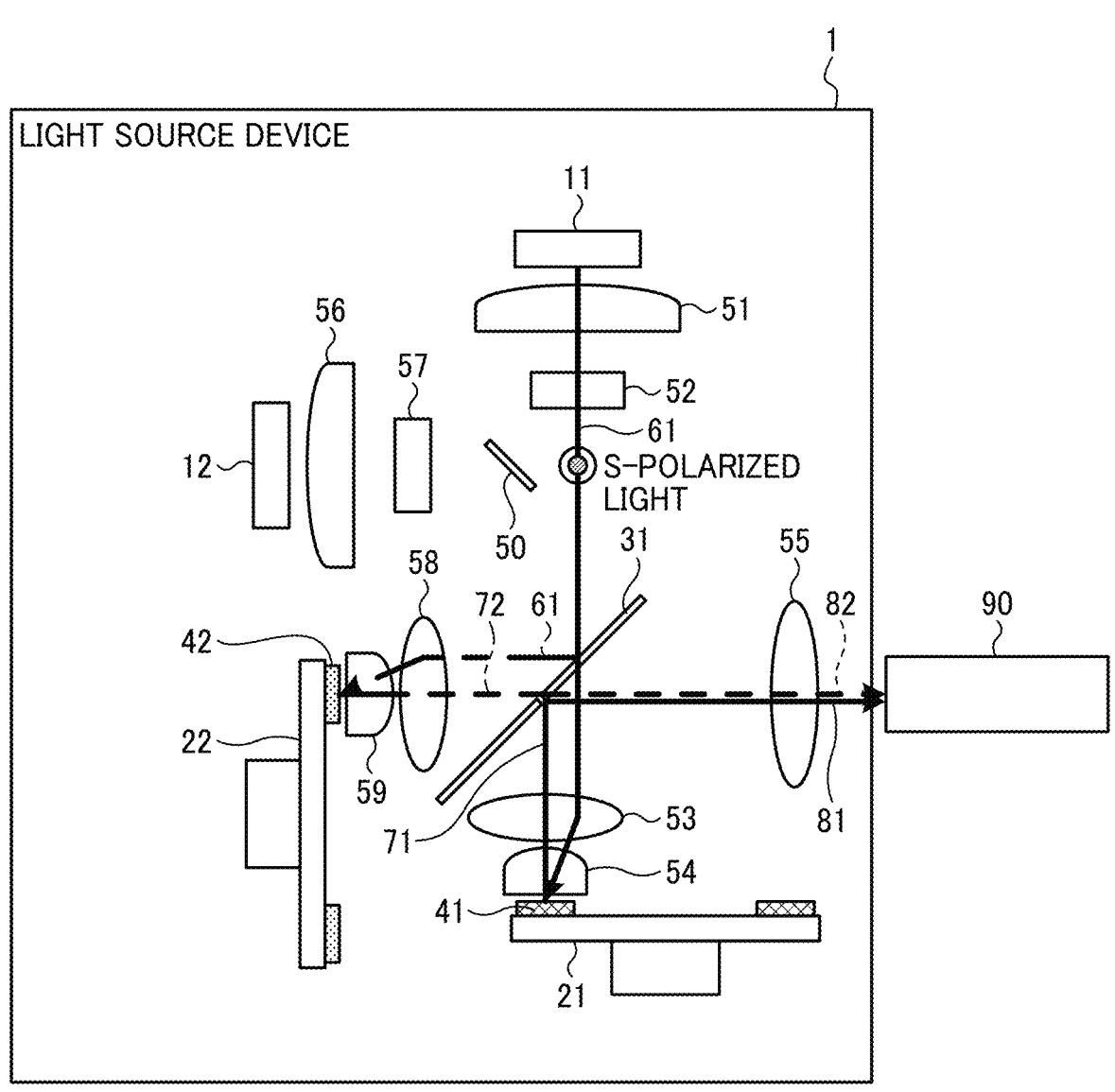
FIG. 23A is an illustration of the entire configuration of a light source device according to a ninth embodiment.
Figure 23B:
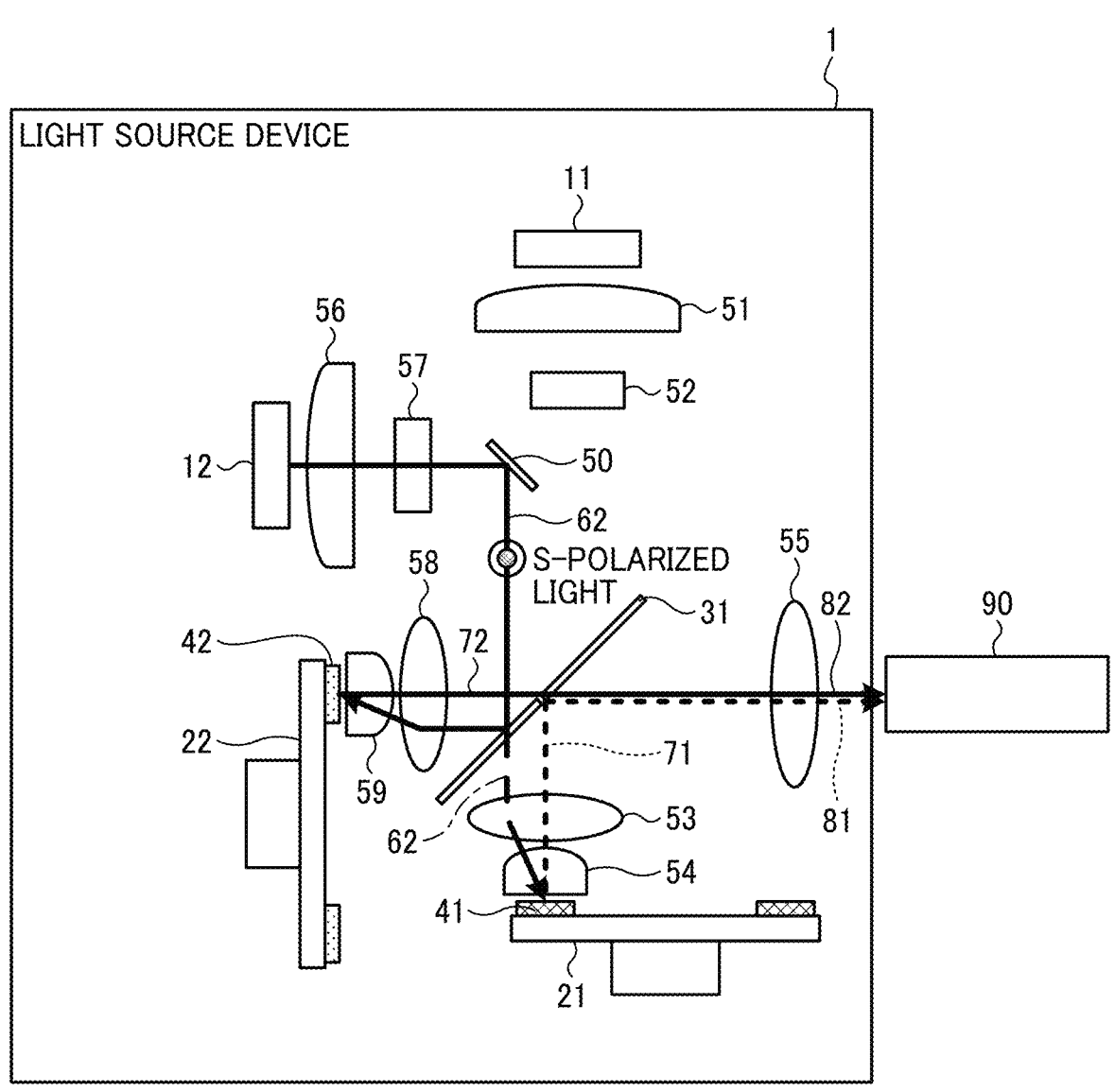
FIG. 23B is another illustration of the entire configuration of the light source device according to the ninth embodiment.
Figure 24A:
FIGS. 24A, 24B, and 24C are illustrations of the shapes of laser sources and an optical homogenizer according to an embodiment of the present disclosure.
Figure 24B:
Figure 24C:
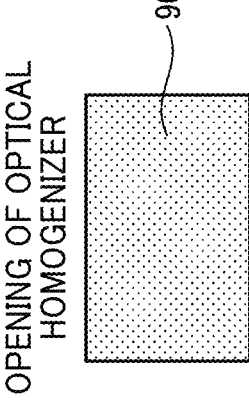

FIGS. 23A and 23B are illustrations of the entire configuration of the light source device 1 according to a ninth embodiment. FIGS. 24A, 24B, and 24C are illustrations of shapes of the first and second laser light sources and the optical homogenizer according to an embodiment of the present disclosure.

In the light source device 1 according to the present embodiment as illustrated in FIGS. 23A and 23B, the polarization direction (for transmission) of the first excitation beam emitted from the first laser source 11 to the dichroic filter layer 311 is the same with the polarization direction (for reflection) of the second excitation beam emitted from the second laser source 12 to the dichroic filter layer 312. In the first embodiment, substantially S-polarized light is used for each of the first excitation beam and the second excitation.

The following describes the reasons why both the first excitation beam emitted from the first laser source 11 to the dichroic filter layer 311 and the second excitation beam emitted from the second laser source 12 to the dichroic filter layer 312 are set to the same polarized light (i.e., substantially S-polarized light).

As illustrated in FIGS. 24A, 24B, and 24C, the light-emitting surface of the first laser source 11 and the second laser source 12 and the opening 90a of the optical homogenizer 90 have the same aspect ratio. In other words, the long side of the opening 90a of the optical homogenizer 90, the long side of a first projection image formed by a first fluorescent beam entering the optical homogenizer 90, and the long side of a second projection image formed by a second fluorescent beam entering the optical homogenizer 90 are substantially parallel to each other.

The same aspect ratio set for each of the light-emitting surfaces of the first and second laser sources 11 and 12 and the opening 90a of the optical homogenizer 90 enables a higher light utilization efficiency.

However, in the light source device 1 according to the present embodiment, the first laser source 11 and the second laser source 12 are orientated in the same direction so that the polarization direction is the same between the first laser source 11 and the second laser source 12. This configuration adversely reduces the color purity as described with reference to FIG. 21A.

As illustrated in FIGS. 23A and 23B, the light source device 1 of the present embodiment uses a green phosphor with a peak wavelength of, for example, approximately 515 nm for the phosphor 41 of the phosphor wheel 21.

Further, the light source device 1 of the present embodiment uses a yellow phosphor with a peak wavelength of, for example, approximately 540 nm for the phosphor 42 of the phosphor wheel 22.

In light source device 1 according to the present embodiment, the transmittance and reflectance characteristics of two dichroic filter layers 311 and 312 of the beam splitting and combining element 31 are changed in accordance with the green phosphor 41 of the phosphor wheel 21 and the yellow phosphor 42 of the phosphor wheel 22. Since the concept is the same as in the first to eighth embodiments, description thereof is omitted.

The reason why the green phosphor is used for the phosphor wheel 21 and the yellow phosphor is used for the phosphor wheel 22 is due to a difference in relative luminous efficiency (or relative luminosity) The relative luminous efficiency is a degree of brightness sensed by human eyes for each wavelength of light. To be more specific, human eyes perceive green light in the vicinity of the 555 nm as the brightest light, and perceive red light and blue light as the dark light.

For this reason, when green light is mixed with red light, the green light is easily perceived by human eyes, and a decrease in the color purity of red is noticeable. However, when red light is mixed with green light, the red light is hardly perceived by human eyes, and thus a decrease in the color purity of green is hardly recognized.

In the light source device 1 of the present embodiment, the green phosphor 41 is disposed on the phosphor wheel 21 in which a decrease in color purity is likely to occur because S-polarized light is transmitted through the dichroic filter layer 311 in the optical path of the first laser light source 11. Thus, the decrease in color purity is substantially inconspicuous.

The following describes each optical path in the light source device 1 according to the present embodiment.

As illustrated in FIG. 23A, the laser beam 61 emitted from the first laser source 11 turns a thin and substantially collimated beam after passing through the lenses 51 and 52. Then, most of the laser beam 61 is transmitted through the dichroic filter layer 311 on the beam splitting and combining element 31, and then strikes on the phosphor 41 on the phosphor wheel 21.

The phosphor 41 of phosphor wheel 21 is excited by the laser beam 61 striking on the phosphor 41 and emits a first fluorescent beam 71. The first fluorescent beam 71 is emitted from the phosphor 41 to the beam splitting and combining element 31 with the Lambert light distribution. The first fluorescent beam 71 strikes on the dichroic filter layer 311 and the dichroic filter layer 312 so that a color light beam 81 in a certain wavelength band, particularly, a green-color wavelength band reflects off the dichroic filter layer 311 and the dichroic filter layer 312 because of the characteristics thereof and proceeds to the optical homogenizer 90.

A small amount of rays of the laser beam 61 emitted from the first laser source 11 strikes on the phosphor 42 of phosphor wheel 22. The phosphor 42 of phosphor wheel 22 is excited by the small amount of rays of the laser beam 61 striking on the phosphor 42 and emits a second fluorescent beam 72.

The second fluorescent beam 72 is emitted from the phosphor 42 to the beam splitting and combining element 31 with the Lambert light distribution. The second fluorescent beam 72 strikes on the dichroic filter layer 311 and the dichroic filter layer 312 so that a color light beam 82 in a certain wavelength band, particularly, a red-color wavelength band is transmitted through the dichroic filter layer 311 and the dichroic filter layer 312 because of the characteristics thereof and proceeds to the optical homogenizer 90.

As a result, the color light beam 81 (i.e., a green light beam) is slightly mixed with the color light beam 82 (i.e., a red light beam). However, the green light beam mixed with the red light beam does not cause a decrease in the color purity of green light because red light is hardly perceived by human eyes and the decrease in the color purity of green light is hardly recognized.

As illustrated in FIG. 23B, the laser beam 62 emitted from the second laser source 12 turns a thin and substantially collimated beam after passing through the lenses 56 and 57 and reflects off the mirror 50. Most of the laser beam 62 emitted from the second laser source 12 reflects off the dichroic filter layer 312 on the beam splitting and combining element 31 and proceeds to strike on the phosphor 42 of the phosphor wheel 22. The phosphor 42 of phosphor wheel 22 is excited by the laser beam 62 striking on the phosphor 42 and emits second fluorescent beam 72.

The second fluorescent beam 72 is emitted from the phosphor 42 to the beam splitting and combining element 31 with the Lambert light distribution. The second fluorescent beam 72 strikes on the dichroic filter layer 311 and the dichroic filter layer 312 so that a color light beam 82 in a certain wavelength band, particularly, a red-color wavelength band is transmitted through the dichroic filter layer 311 and the dichroic filter layer 312 because of the characteristics thereof and proceeds to the optical homogenizer 90.

A small amount of rays of the laser beam 62 emitted from the second laser source 12 strikes on the phosphor 41 of phosphor wheel 21. The phosphor 41 of phosphor wheel 21 is excited by the laser beam 61 striking on the phosphor 41 and emits a first fluorescent beam 71. The first fluorescent beam 71 is emitted from the phosphor 41 to the beam splitting and combining element 31 with the Lambert light distribution. The first fluorescent beam 71 strikes on the dichroic filter layer 311 and the dichroic filter layer 312 so that a color light beam 81 in a certain wavelength band, particularly, a green-color wavelength band reflects off the dichroic filter layer 311 and the dichroic filter layer 312 because of the characteristics thereof and proceeds to the optical homogenizer 90.

In this case, the color light beam 81 (i.e., a red light beam) is slightly mixed with the color light beam 82 (a green light beam), and the color purity of the red light decreases. However, since the S-polarized light reflects off the dichroic filter layer 312 in the optical path of the second laser source 12 (i.e., the reflectance ratio of the light beam reflecting off the dichroic filter layer 312 is high), the decrease in the color purity of the red light is small.

As described above, in the light source device 1 of the present embodiment, the green phosphor 41 is disposed on the phosphor wheel 21 in which a decrease in color purity is likely to occur because S-polarized light is transmitted through the dichroic filter layer 311 in the optical path of the first laser light source 11. Thus, the decrease in color purity is substantially inconspicuous.

As described above, the present embodiment of the present embodiment uses a first relative luminosity of the first fluorescent beam based on the first excitation beam higher than a second relative luminosity of the second fluorescent beam based on the second excitation beam, so as to make a decrease in color purity substantially inconspicuous.

In the present embodiment, the polarization direction (i.e., the polarized light is used for transmission) of the first excitation beam emitted from the first laser source 11 to the dichroic filter layer 311 is the same as the polarization direction (i.e., the polarized light is used for reflection) of the second excitation beam emitted from the second laser source 12 to the dichroic filter layer 312. In other words, both the first excitation beam and the second excitation beam are substantially S-polarized light. However, no limitation is intended thereby.

For example, in some examples, both the first excitation beam emitted from the first laser source 11 to the dichroic filter layer 311 and the second excitation beam emitted from the second laser source 12 to the dichroic filter layer 312 are set to the same polarized light (i.e., substantially P-polarized light). In this configuration, the second relative luminosity of the second fluorescent beam based on the second excitation beam is set higher than the first relative luminosity of the first fluorescent beam based on the first excitation beam, so as to make a decrease in color purity substantially inconspicuous.

TENTH EMBODIMENT

A tenth embodiment will be described.

The tenth embodiment differs from the first embodiment in that a polarization convertor 92 is disposed upstream from the beam splitting and combining element 31 in the optical path of light emitted from the first laser source 11.

In the following description of the tenth embodiment, the description of the same configurations as in the first embodiment will be omitted, and those different from the first embodiment will be described.

Figure 25:
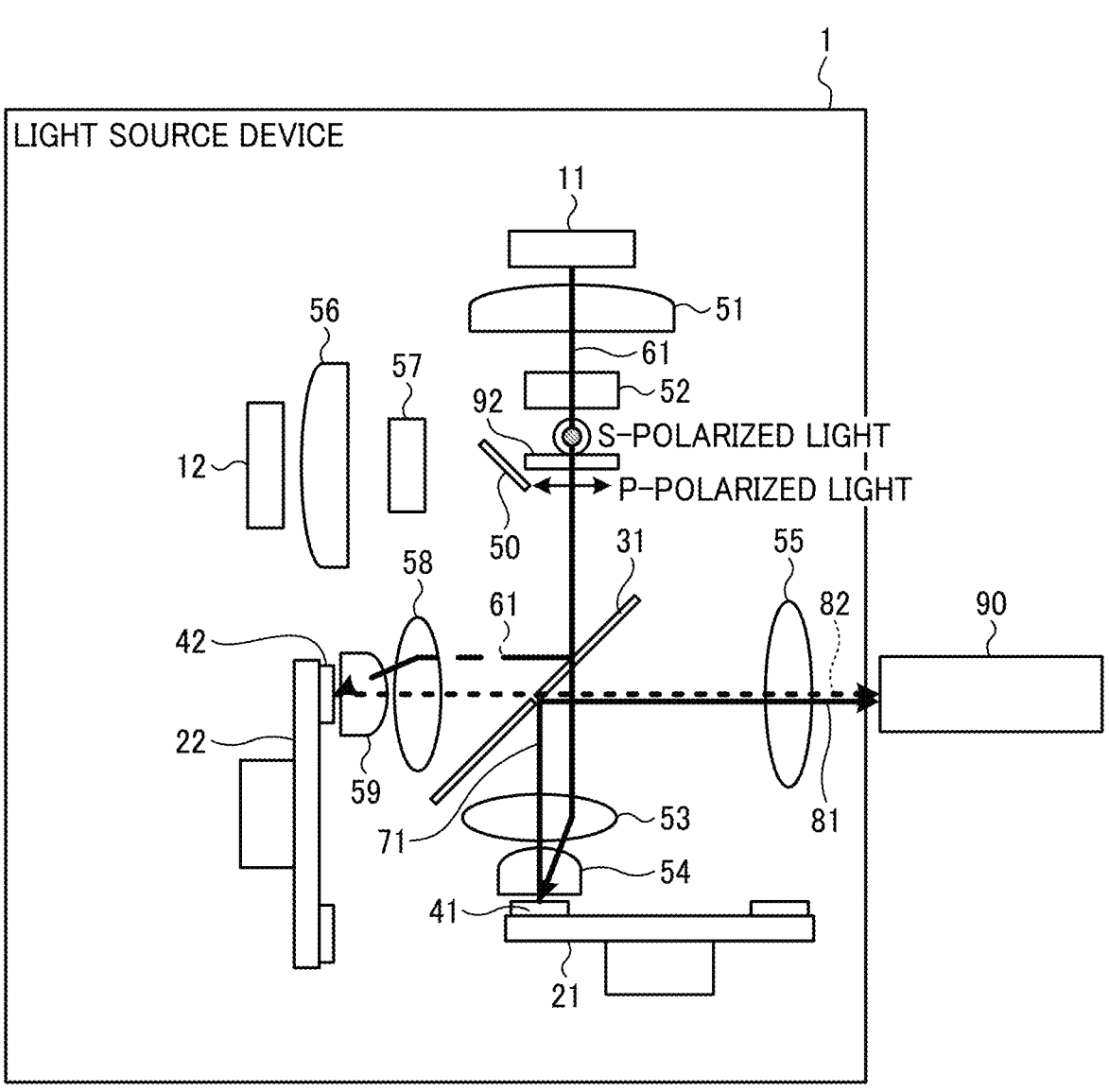
FIG. 25 is an illustration of the entire configuration of a light source device according to a tenth embodiment.

FIG. 25 is an illustration of the entire configuration of a light source device 1 according to the tenth embodiment. As illustrated in FIG. 25, the light source device 1 of the present embodiment includes a polarization convertor 92 disposed upstream from the beam splitting and combining element 31 along the optical path of the laser beam 61 emitted from the first laser source 11 in a direction in which the first laser source 11 emits the laser beam 61.

The polarization convertor 92 is, for example, a ½λ plate, and is an element that rotates the polarization direction by 90 degrees. The polarization convertor 92 allows conversion of S-polarized light emitted from the first laser source 11 into P-polarized light and increases the transmittance of the dichroic filter layer 311 of the beam splitting and combining element 31, thus reducing or preventing a decrease in color purity.

Thus, the present embodiment reduces a decrease in color purity.

Although the polarization convertor 92 is disposed between the first laser source 11 and the beam splitting and combining element 31 in the present embodiment, no limitation is indicated thereby. Alternatively, the polarization convertor 92 is disposed between the second laser source 12 and the beam splitting and combining element 31.

ELEVENTH EMBODIMENT

An eleventh embodiment will be described.

The eleventh embodiment differs from the first embodiment in that each of the first laser source 11, the second laser source 12, and the optical homogenizer 90 is tilted by 10 degrees and in that a polarization convertor 93 is disposed upstream from the beam splitting and combining element 31 along the optical path of light emitted from the first laser source 11 in the direction in which the first laser source 11 emits the light and another polarization convertor 94 is disposed upstream from the beam splitting and combining element 31 in the optical path of light emitted from the second laser source 12 in the direction in which the second laser source 12 emits the light.

In the following description of the tenth embodiment, the description of the same configurations as in the first embodiment will be omitted, and those different from the first embodiment will be described.

Figure 26B:
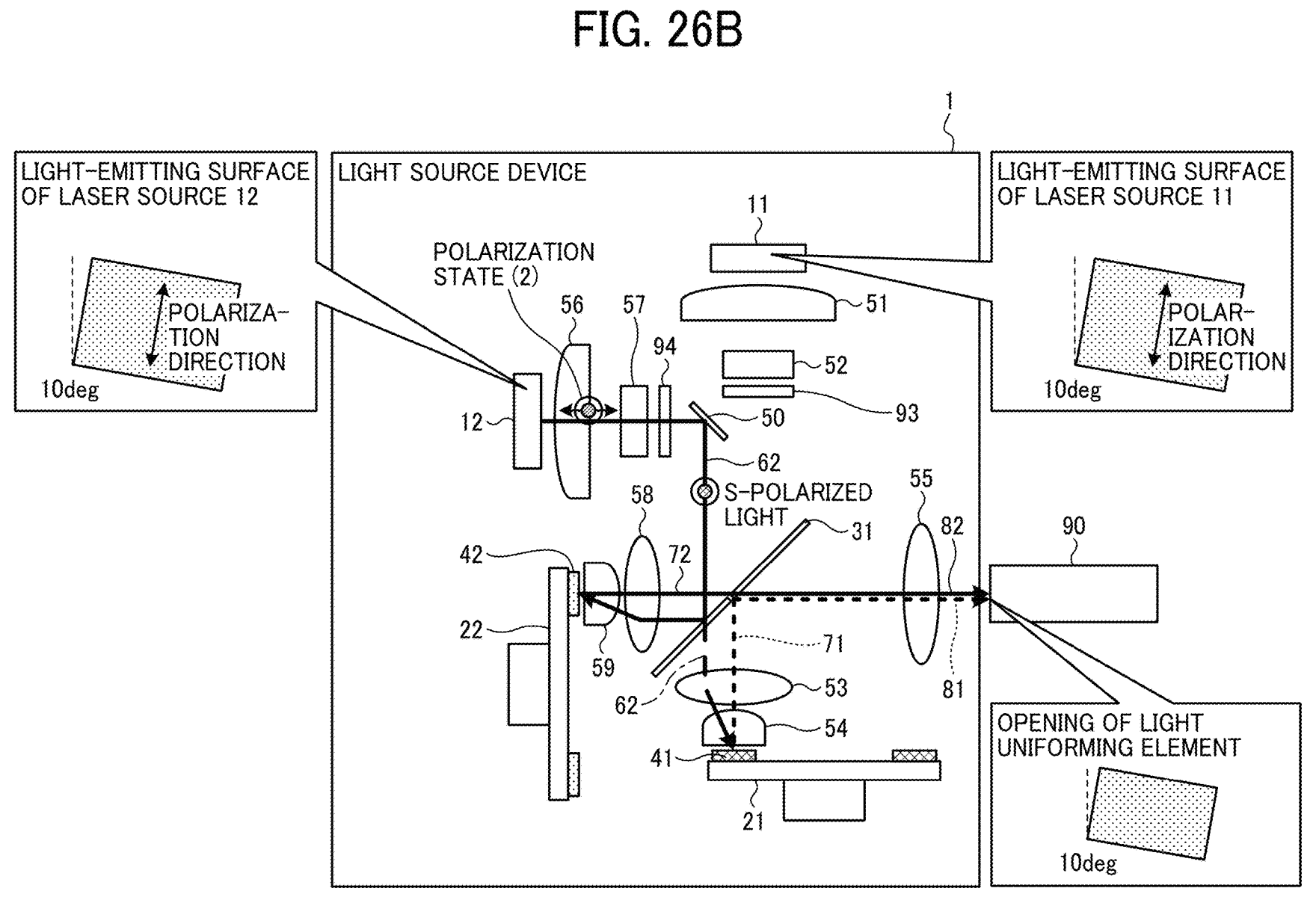

FIGS. 26A and 26B are illustrations of the entire configuration of a light source device 1 according to the eleventh embodiment.

In the light source device 1 illustrated in FIGS. 26A and 26B, each of the first laser source 11, the second laser source 12, and the optical homogenizer 90 is tilted by 10 degrees unlike the light source device 1 of the first embodiment.

The optical homogenizer 90 is often arranged tilted in view of the balance with the image forming element (image display element) of the illumination optical system of the projector 100. Accordingly, the first laser source 11 and the second laser source 12 are also tilted.

With the first laser source 11 and the second laser source 12 tilted by 10 degrees, the polarization direction of each of the first laser source 11 and the second laser source 12 is also tilted by 10 degrees.

With such a configuration, the laser beam emitted from the first laser source 11 to the dichroic filter layer 311 of the beam splitting and combining element 31 has both P-polarized light component and S-polarized light component, which is referred to as a first polarization state as illustrated in FIG. 26A.

Further, the laser beam emitted from the second laser source 12 has both P-polarized light component and S-polarized light component, which is referred to as a second polarization state as illustrated in FIG. 26B.

In addition, the light source device 1 in FIGS. 26A and 26B includes a polarization convertor 93 disposed upstream from the beam splitting and combining element 31 in the optical path of the laser beam from the first laser source 11 in a first direction in which the first laser source 11 emits the laser beam and another polarization convertor 94 disposed upstream from the beam splitting and combining element 31 in the optical path of the laser beam from the second laser source 12 in a second direction in which the second laser source 12 emits the laser beam.

The polarization convertor 93 is, for example, a wave plate. The polarization convertor 93 has an axis for rotating the polarization of the laser beam from the first laser source 11 by 80 degrees.

Thus, as illustrated in FIG. 26A, the polarization convertor 93 serves to convert the first polarization state of the laser beam from the first laser source 11 into P-polarized light.

The polarization convertor 94 is, for example, a wave plate. The polarization convertor 94 has an axis for rotating the polarization of the laser beam from the second laser source 12 by 10 degrees.

Thus, as illustrated in FIG. 26B, the polarization convertor 94 serves to convert the second polarization state of the laser beam from the second laser source 12 into S-polarized light.

The present embodiment allows the laser beam emitted from the first laser source 11 to the dichroic filter layer 311 (to be used for transmission) of the beam splitting and combining element 31 to strike on the dichroic filter layer 311 as P-polarized light and also allows the laser beam emitted from the second laser source 12 to the dichroic filter layer 312 (to be used for reflection) of the beam splitting and combining element 31 to strike on the dichroic filter layer 312 as S-polarized light.

As a result, the polarization state of the laser beam striking on the dichroic filter layers 311 and 312 of the beam splitting and combining element 31 can be manipulated, and a decrease in color purity can be reduced.

Alternatively, the polarization state of the light beam striking on the dichroic filter layers 311 and 312 of the bear splitting and combining element 31 may be set as desired in accordance with the characteristics of the dichroic filter layer 311 and the dichroic filter layer 312.

If there is no need to make the aspect ratio of the light source uniform, the light source itself may be rotated to produce P-polarized light or S-polarized light.

ELEVENTH EMBODIMENT

A second embodiment will be described.

The twelfth embodiment of the present disclosure is different from the first embodiment to the eleventh embodiment of the present disclosure in that an image projection apparatus includes a light source device 1 according to any one of the first embodiment to the eleventh embodiment of the present disclosure.

Note that like reference signs are given to elements similar to those described in the first embodiment to the eleventh embodiment, and their detailed description is omitted in the following description of the first embodiment to the eleventh embodiment of the present disclosure.

Figure 27:
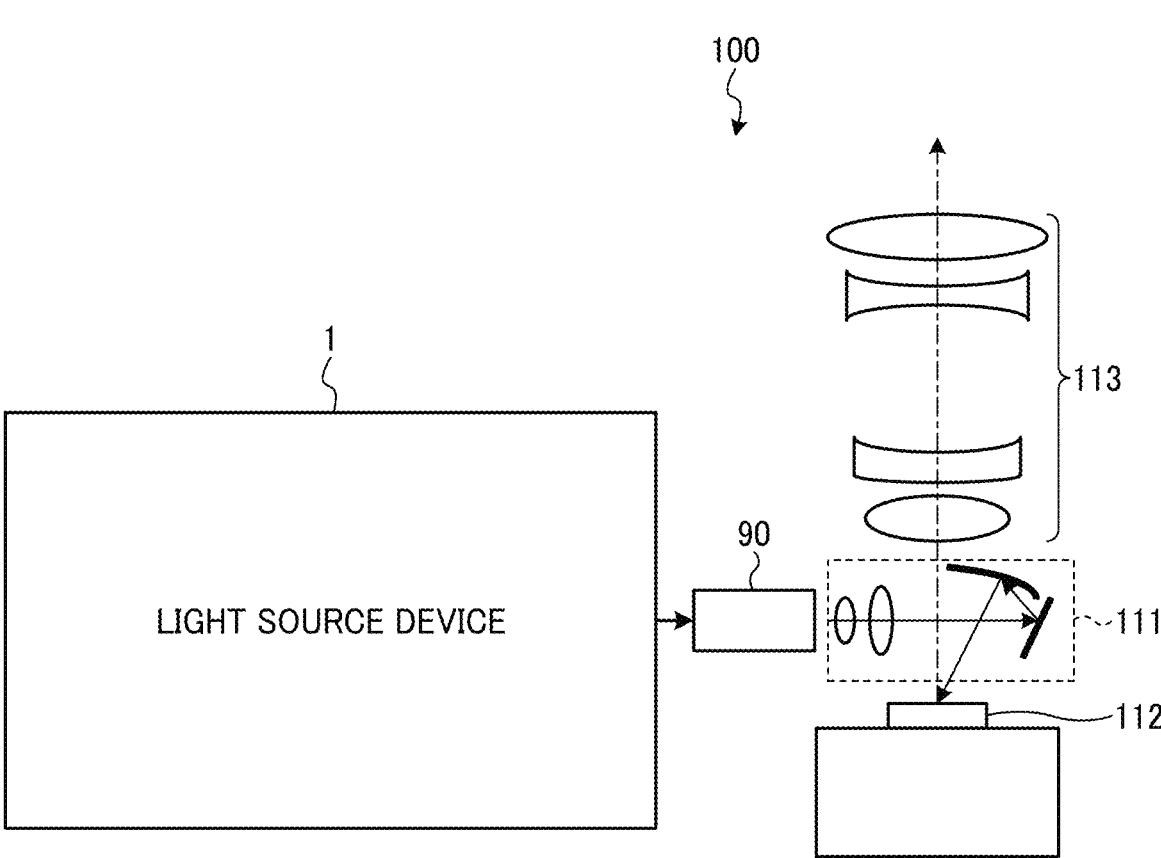
FIG. 27 is a diagram of a projector according to a twelfth embodiment.

FIG. 27 is a diagram of a projector 100 according to a twelfth embodiment of the present disclosure.

The projector 100 (a projection apparatus) includes a light source device 1, an optical homogenizer 90, an illumination optical system 111, an image forming element 112 (an image display element), and a projection optical system 113.

The light source device 1 emits, for example, light including wavelengths corresponding to colors of red, green, and blue (RGB).

The optical homogenizer 90 mixes and homogenizes light beams emitted from the light source device 1. More specifically, a flux of the light beams entered into the entrance surface of the optical homogenizer 90 propagate through the optical homogenizer 90 while repeatedly reflecting off the internal surface of the optical homogenizer 90, and exit from an exit surface of the optical homogenizer 90.

The optical homogenizer 90 causes the flux of the light beams entered through the entrance surface to reflect multiple times inside and homogenizes the intensities of the light beams coming from the exit surface, thus forming a surface light source that emits a flux of light beams having uniform intensity on the exit surface.

Examples of the optical homogenizer 90 include: a light tunnel enclosed by four mirror plates facing inside, which is a hollow tunnel; a rod integrator that is a prism of transparent material such as glass; and a fly-eye lens.

For example, when a light tunnel is used as the optical homogenizer 90, the exit of the light tunnel is projected onto the surface of the image forming element 112 (an image display element) 112 with an aspect ratio substantially equal to that of the image forming element 112. This allows an efficient illumination on the surface of the image forming element 112 (the image display element) without waste.

The illumination optical system 111 illuminates the image forming element 111 substantially uniformly with light homogenized (i.e., the light having a uniform intensity) by the optical homogenizer 90. The illumination optical system 111 includes, for example, at least one lens and at least one reflecting surface.

For example, the image forming element 112 (the image display element) includes, for example, a light valve such as a digital micromirror device (DMD), a transmissive liquid crystal panel, and a reflective liquid crystal panel. The image forming element 112 (the image display element) modulates light provided for illumination by the illumination optical system 111 (light from a light source optical system of the light source device 1) to form an image.

The projection optical system 113 magnifies and projects the image formed by the image forming element 112 (the image display element) onto a screen (projection surface).

The projection optical system 113 includes, for example, at least one lens. The projection optical system 113 has a conjugate relation with the image from the surface of the image forming element 112 (the image display element) and a desired screen (the projection surface) at which the image from the surface of the image forming element 112 (the image display element) is formed as an enlarged image. In other words, the projection optical system 113 enlarges and projects a spatially-modulated image on the surface of the image forming element 112 (the image display element) onto the screen.

As described above, embodiments of the present disclosure provide a compact projector using the light source device 1.

While specific examples desirable for the present disclosure are described in the above-described embodiments; however, the disclosure is not limited to the contents.

In particular, the specific shapes and numerical values of the respective components exemplified in the embodiments are merely examples for implementing the disclosure. The technical scope of the disclosure should not be limitedly interpreted thereby.

The present disclosure is not limited to the contents described in the embodiments, and may be properly modified within the scope of the disclosure.

Aspects of the present invention are as follows, for example.

Aspect 1

A light source device includes: a first light source configured to emit a first excitation beam; a second light source different from the first light source, a second light source configured to emit a second excitation beam: an optical combiner configured to: reflect or transmit the first excitation beam; and reflect or transmit the second excitation beam; a first wavelength converter including a first phosphor to which the first excitation beam transmitted through the optical combiner enters and excites the first phosphor to cause the first phosphor to emit a first fluorescent beam proceeding in a first optical path; and a second wavelength convertor including a second phosphor to which the second excitation beam reflected by the optical combiner enters and excites the second phosphor to cause the second phosphor to emit a second fluorescent beam proceeding in a second optical path. The optical combiner is at a point at which the first optical path of the first fluorescent beam intersects the second optical path of the second fluorescent beam. The optical combiner is further configured to: combine the first fluorescent beam and the second fluorescent beam to generate a flux of a combination of the first fluorescent beam and the second fluorescent beam; and emit the flux of the combination in one emission direction.

Aspect 2

According to Aspect 2, in the light source device of Aspect 2, the optical combiner further includes a filter part on a surface of the optical combiner, and the filter part configured to: transmit the first excitation beam; and reflect the second excitation beam.

Aspect 3

In Aspect 3, in the light source device of Aspect 1, the optical combiner further includes: a first part on a surface of the optical combiner, the first part configured to: transmit the first excitation beam; and reflect the first fluorescent beam; and a second part on the surface of the optical combiner, the second part configured to: reflect the second excitation beam; and transmit the second fluorescent beam.

Aspect 4

In the light source device of Aspect 3, the first part is in the first optical path of the first fluorescent beam; and the second part is in the second optical path of the second fluorescent beam.

Aspect 5

In the light source device of any one of Aspect 1 to Aspect 4, the optical combiner is a dichroic mirror, and the dichroic mirror has one surface having: a first area onto which the first excitation beam strikes; and a second area onto which the second excitation beam strikes.

Aspect 6

In the light source device of Aspect 1, the first part is in the first area, and the second part is in the second area. The first part transmits the first excitation beam, and the second part reflects the second excitation beam.

Aspect 7

In the light source device of Aspect 6, the first excitation beam that strikes onto the first area is substantially P-polarized light, and the second excitation beam that strikes onto the second area is substantially S-polarized light.

Aspect 8

The light source device of Aspect 7, further comprising a polarization converter disposed at least one of: a first position between the first light source and the optical combiner; and a second position between the second light source and the optical combiner.

Aspect 9

In the light source device of any one of Aspect 1 to Aspect 8, a first longitudinal side, a second longitudinal side, and a third longitudinal side are substantially parallel to each other where the first longitudinal side is a longitudinal side of a first projection image of the first fluorescent beam emitted to an opening of an optical homogenizer that homogenizes light intensity of light emitted from the light source device, the second longitudinal side is a longitudinal side of a second projection image of the second fluorescent beam emitted to the opening of the optical homogenizer; and the third longitudinal side is a longitudinal side of the opening of the optical homogenizer.

Aspect 10

In the light source device of Aspect 6, the first excitation beam to strike onto the first area is substantially S-polarized light, the second excitation beam to strike onto the second area is substantially S-polarized light, and a first luminosity of the first fluorescent beam is higher than a second luminosity of the second fluorescent beam.

Aspect 11

In the light source device of Aspect 6, the first excitation beam to strike onto the first area is substantially P-polarized light, the second excitation beam to strike onto the second area is substantially P-polarized light, and a first luminosity of the first fluorescent beam is lower than a second luminosity of the second fluorescent beam.

Aspect 12 In the light source device of Aspect 6, each of the first area and the second area reflects the first fluorescent beam and transmits the second fluorescent beam.

Aspect 13

In the light source device of Aspect 1 or 2, the optical combiner is a dichroic mirror configured to separate the first excitation beam from the second excitation beam, and a first wavelength of the first excitation beam is different from a second wavelength of the second excitation beam.

Aspect 14

In the light source device of Aspect 1 or 2, the optical combiner is a polarization splitter configured to separate the first excitation beam from the second excitation beam, and a first polarization direction of the first excitation beam is different from a second polarization direction of the second excitation beam.

Aspect 15

In the light source device of any one of Aspect 1 to Aspect 14, the optical combiner is further configured to perform at least one of: optically filtering the first fluorescent beam to convert the first fluorescent beam to a first color beam; or optically filtering the second fluorescent beam to convert the second fluorescent beam to a second color beam.

Aspect 16

In the light source device of any one of Aspect 1 to Aspect 15, the first optical path has a first optical length between the first wavelength converter and the optical combiner. The second optical path has a second optical length between the second wavelength converter and the optical combiner. The first optical length and the second optical length are substantially the same.

Aspect 17

In the light source device of any one of Aspect 1 to Aspect 16, a first flux of the first fluorescent beam and a second flux of the second fluorescent beam emitted from the optical combiner proceed in said one emission direction. The first flux partially overlaps or substantially coincides with the second flux.

Aspect 18

According to Aspect 18, in the light source device of any one of Aspect 1 to Aspect 16, the first fluorescent beam and the second fluorescent beam emitted from the beam splitting and combining element in the same direction are coincident with each other.

Aspect 19

According to Aspect 19, in the light source device of any one of Aspect 1 to Aspect 12, the second excitation beam emitted from the second light source is the same as the first excitation beam emitted from the first light source.

Aspect 20

According to Aspect 20, the light source device of any one of Aspect 1 to Aspect 19, further includes a first beam narrowing element configured to narrow the first excitation beam to strike on the optical combiner; and a second beam narrowing element configured to narrow the second excitation beam to strike on the optical combiner.

Aspect 21

According to Aspect 21, the light source device of any one of Aspect 1 to Aspect 20, further includes: a first refractor configured to converge the first excitation beam to strike on the first wavelength converter and substantially collimate the first fluorescent beam; and a second refractor configured to converge the second excitation beam to strike on the second wavelength converter and substantially collimate the second fluorescent beam.

Aspect 22

According to Aspect 22, in the light source device of Aspect 21, the optical combiner is disposed at a point of intersection between the optical axes of the first refractor and the second refractor.

Aspect 23

According to Aspect 23, in the light source device of any one of Aspect 1 to Aspect 22, a first axis (a major axis of the laser beam 61) of the diameter of a spot of the first excitation beam on the optical combiner is substantially parallel to a second axis (a major axis of the laser beam 62) of the diameter of a spot of the second excitation beam on the optical combiner.

Aspect 24

In the light source device of Aspect 6, the first excitation beam on the optical combiner has a first major axis of a first spot diameter. The second excitation beam on the optical combiner has a second major axis of a second spot diameter, and the first major axis and the second major axis are substantially parallel to a boundary face between the first area and the second area.

Aspect 25

The light source device of any one of Aspect 1 to Aspect 24, further includes: a third light source configured to emit a third excitation beam that is blue light; and a mirror configured to: combine the third excitation beam with the flux of the combination of the first fluorescent beam and the second fluorescent beam; and emit a flux of a combination of the first fluorescent beam, the second fluorescent beam, and the third fluorescent beam in said one emission direction.

Aspect 26

In the light source device of Aspect 25, the first excitation beam, the second excitation beam, and the third excitation beam form substantially white light.

Aspect 27

A projection apparatus includes: the light source device according to Aspect J: an optical homogenizer configured to: homogenize light intensities of the flux of the combination emitted from the light source device to generate homogenized light beam; and emit the homogenized light beam; an image display element configured to modulate the homogenized light beams to form an image; and a projection optical system configured to enlarge and project the image onto a projection surface.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light source device comprising:
a first light source configured to emit a first excitation beam;
a second light source different from the first light source, a second light source configured to emit a second excitation beam;
a first beam narrowing element configured to narrow the first excitation beam prior to striking an optical combiner;
a second beam narrowing element configured to narrow the second excitation beam prior to striking the optical combiner;
the optical combiner configured to:
reflect or transmit the first excitation beam after narrowing; and reflect or transmit the second excitation beam after narrowing;
a first wavelength converter including a first phosphor to which the first excitation beam transmitted through the optical combiner enters and excites the first phosphor to cause the first phosphor to emit a first fluorescent beam proceeding in a first optical path; and
a second wavelength converter including a second phosphor to which the second excitation beam reflected by the optical combiner enters and excites the second phosphor to cause the second phosphor to emit a second fluorescent beam proceeding in a second optical path,
wherein the optical combiner is at a point at which the first optical path of the first fluorescent beam intersects the second optical path of the second fluorescent beam, and
the optical combiner is further configured to:
combine the first fluorescent beam and the second fluorescent beam to generate a flux of a combination of the first fluorescent beam and the second fluorescent beam; and
emit the flux of the combination in one emission direction,
wherein
the optical combiner is a dichroic mirror,
the dichroic mirror has one surface having:
a first area onto which the first excitation beam strikes; and
a second area onto which the second excitation beam strikes,
the first part is in the first area,
the second part is in the second area,
the first part transmits the first excitation beam,
the second part reflects the second excitation beam,
the first excitation beam on the optical combiner has a first major axis of a first spot diameter,
the second excitation beam on the optical combiner has a second major axis of a second spot diameter, and
the first major axis and the second major axis are substantially parallel to a boundary face between the first area and the second area.

2. The light source device according to claim 1, wherein the optical combiner further includes a filter part on a surface of the optical combiner, and
the filter part configured to:
transmit the first excitation beam; and
reflect the second excitation beam.

3. The light source device according to claim 1, wherein the optical combiner further includes:
a first part on a surface of the optical combiner, the first part configured to:
transmit the first excitation beam; and
reflect the first fluorescent beam; and
a second part on the surface of the optical combiner, the second part configured to:
reflect the second excitation beam; and
transmit the second fluorescent beam.

4. The light source device according to claim 3, wherein the first part is in the first optical path of the first fluorescent beam; and
the second part is in the second optical path of the second fluorescent beam.

5. The light source device according to claim 1, wherein the first excitation beam that strikes on the first area is substantially P-polarized light, and
the second excitation beam that strikes onto the second area is substantially S-polarized light.

6. The light source device according to claim 5, further comprising a polarization converter disposed at least one of:
   a first position between the first light source and the optical combiner; and
   a second position between the second light source and the optical combiner.

7. The light source device according to claim 1,
   wherein a first longitudinal side, a second longitudinal side, and a third longitudinal side are substantially parallel to each other,
   where the first longitudinal side is a longitudinal side of a first projection image of the first fluorescent beam emitted to an opening of an optical homogenizer that homogenizes light intensity of light emitted from the light source device;
   the second longitudinal side is a longitudinal side of a second projection image of the second fluorescent beam emitted to the opening of the optical homogenizer; and
   the third longitudinal side is a longitudinal side of the opening of the optical homogenizer.

8. The light source device according to claim 1,
   wherein the first excitation beam to strike onto the first area is substantially S-polarized light,
   the second excitation beam to strike onto the second area is substantially S-polarized light, and
   a first luminosity of the first fluorescent beam is higher than a second luminosity of the second fluorescent beam.

9. The light source device according to claim 1,
   wherein the first excitation beam to strike onto the first area is substantially P-polarized light,
   the second excitation beam to strike onto the second area is substantially P-polarized light, and
   a first luminosity of the first fluorescent beam is lower than a second luminosity of the second fluorescent beam.

10. The light source device according to claim 1,
   wherein each of the first area and the second area reflects the first fluorescent beam and transmits the second fluorescent beam.

11. The light source device according to claim 1,
   wherein the optical combiner is a dichroic mirror configured to separate the first excitation beam from the second excitation beam, and
   a first wavelength of the first excitation beam is different from a second wavelength of the second excitation beam.

12. The light source device according to claim 1,
   wherein the optical combiner is a polarization splitter configured to separate the first excitation beam from the second excitation beam, and a first polarization direction of the first excitation beam is different from a second polarization direction of the second excitation beam.

13. The light source device according to claim 1,
   wherein the optical combiner is further configured to perform at least one of:
   optically filtering the first fluorescent beam to convert the first fluorescent beam to a first color beam; or
   optically filtering the second fluorescent beam to convert the second fluorescent beam to a second color beam.

14. The light source device according to claim 1,
   wherein the first optical path has a first optical length between the first wavelength converter and the optical combiner,
   the second optical path has a second optical length between the second wavelength converter and the optical combiner, and
   the first optical length and the second optical length are substantially the same.

15. The light source device according to claim 1,
   wherein a first flux of the first fluorescent beam and a second flux of the second fluorescent beam emitted from the optical combiner proceed in said one emission direction, and
   the first flux partially overlaps or substantially coincides with the second flux.

16. The light source device according to claim 1, further comprising:
   a third light source configured to emit a third excitation beam that is blue light; and
   a mirror configured to:
      combine the third excitation beam with the flux of the combination of the first fluorescent beam and the second fluorescent beam; and
      emit a flux of a combination of the first fluorescent beam, the second fluorescent beam, and the third fluorescent beam in said one emission direction.

17. A projection apparatus comprising:
   the light source device according to claim 1;
   an optical homogenizer configured to:
      homogenize light intensities of the flux of the combination emitted from the light source device to generate homogenized light beam; and
      emit the homogenized light beam;
   an image display element configured to modulate the homogenized light beams to form an image; and
   a projection optical system configured to enlarge and project the image onto a projection surface.

\* \* \* \* \*